(12) United States Patent
Zhou et al.

(10) Patent No.: US 11,316,364 B2
(45) Date of Patent: Apr. 26, 2022

(54) LED EMERGENCY LIGHT AND THE CONTROL METHOD THEREOF

(71) Applicant: CH LIGHTING TECHNOLOGY CO., LTD., Shaoxing (CN)

(72) Inventors: Jun Zhou, Shaoxing (CN); Jizhong Pu, Shaoxing (CN)

(73) Assignee: CH LIGHTING TECHNOLOGY CO., LTD., Shaoxing (CN)

( * ) Notice: Subject to any disclaimer, the term of this patent is extended or adjusted under 35 U.S.C. 154(b) by 131 days.

(21) Appl. No.: 17/012,100

(22) Filed: Sep. 4, 2020

(65) Prior Publication Data
US 2021/0226475 A1    Jul. 22, 2021

(30) Foreign Application Priority Data

| Jan. 17, 2020 | (CN) | 202010053086.X |
| Mar. 27, 2020 | (CN) | 202010230188.4 |
| Mar. 27, 2020 | (CN) | 202010230199.2 |
| Mar. 27, 2020 | (CN) | 202010231561.8 |
| Mar. 27, 2020 | (CN) | 202010231615.0 |
| Mar. 27, 2020 | (CN) | 202020425569.3 |
| Mar. 27, 2020 | (CN) | 202020427653.9 |
| Mar. 27, 2020 | (CN) | 202020427753.1 |
| Mar. 27, 2020 | (CN) | 202020428236.6 |
| Mar. 27, 2020 | (CN) | 202020428502.5 |
| Mar. 27, 2020 | (CN) | 202020428873.3 |

(51) Int. Cl.
*H02J 9/00* (2006.01)
*H02J 9/02* (2006.01)
(Continued)

(52) U.S. Cl.
CPC ............... *H02J 9/02* (2013.01); *B60Q 3/46* (2017.02); *B60Q 7/00* (2013.01); *B60Q 11/002* (2013.01); *F21S 9/022* (2013.01); *F21S 9/024* (2013.01); *H02J 7/0029* (2013.01); *H02J 7/0047* (2013.01); *H02J 7/02* (2013.01); *H05B 45/34* (2020.01); *H05B 45/345* (2020.01);
(Continued)

(58) Field of Classification Search
CPC .......... H02J 9/02; H02J 7/0029; H02J 7/0047; H02J 7/02; B60A 3/46; B60Q 7/00; B60Q 11/002; F21S 9/022; F21S 9/024
See application file for complete search history.

(56) References Cited

U.S. PATENT DOCUMENTS

| 2002/0044062 A1* | 4/2002 | Yoshioka | G08B 25/016 340/636.15 |
| 2016/0328928 A1* | 11/2016 | Lutz | G08B 5/36 |

(Continued)

*Primary Examiner* — Gerald J Sufleta, II

(57) ABSTRACT

The present disclosure provides an LED straight light including a light tube with two pins at both ends, an LED installed in the light tube and a driving circuit. The driving circuit includes a mains branch and a signal branch. The mains branch is coupled to the pins at one end of the light tube for transmitting power to the LED for power supply. The signal branch is coupled to the pins at the other end of the light tube for transmitting external driving signals to control the on/off of the mains branch. The LED straight light of the present disclosure is powered by two ends, one of the two ends supplies power to the LED through the mains branch, and the other end receives driving signals to control the on/off of the mains branch.

47 Claims, 17 Drawing Sheets

(51) Int. Cl.
| | |
|---|---|
| *F21S 9/02* | (2006.01) |
| *H02J 7/02* | (2016.01) |
| *H05B 45/345* | (2020.01) |
| *H02J 7/00* | (2006.01) |
| *H05B 45/34* | (2020.01) |
| *H05B 45/3725* | (2020.01) |
| *B60Q 3/46* | (2017.01) |
| *B60Q 7/00* | (2006.01) |
| *B60Q 11/00* | (2006.01) |
| *H05B 45/38* | (2020.01) |
| *F21Y 115/10* | (2016.01) |

(52) U.S. Cl.
CPC ...... *H05B 45/3725* (2020.01); *F21Y 2115/10* (2016.08); *H05B 45/38* (2020.01)

(56) References Cited

U.S. PATENT DOCUMENTS

| | | | |
|---|---|---|---|
| 2017/0051886 A1* | 2/2017 | Liu | H05B 45/10 |
| 2020/0120768 A1* | 4/2020 | Liu | H05B 45/50 |
| 2020/0294444 A1* | 9/2020 | Yang | H05B 45/382 |
| 2021/0007193 A1* | 1/2021 | Arulandu | H05B 45/397 |
| 2022/0021195 A1* | 1/2022 | Rathi | H02H 1/0015 |

* cited by examiner

US 11,316,364 B2

1

LED EMERGENCY LIGHT AND THE CONTROL METHOD THEREOF

TECHNICAL FIELD

The present disclosure relates to an LED light, and in particular, to an LED emergency light and a control method thereof.

BACKGROUND

When power is off, traditional LED emergency light provides emergency lighting by lighting the LED through the emergency branch. When power is on, the emergency branch is disconnected and the LED goes out. A mains branch is provided in the driving circuit of the LED emergency light. When power is on, the mains power can light the LED emergency light through the mains branch so that the traditional LED emergency light has a function of daily lighting.

However, the emergency branch and the mains branch of this kind of LED emergency light with daily lighting function may simultaneously supply power to the LED when power is on. In other words, there will be dual circuits supply power to the LED, which will shorten the lifetime of the light, or even causes a risk of burning out the light.

SUMMARY

The present disclosure provides an LED emergency light that can avoid the case that dual circuits supply power to the LED, thereby increasing the serve life of the light.

An LED emergency light comprises an LED and a driving circuit, wherein the driving circuit comprises a mains branch and an emergency branch with a power storage module; when power is on, an external power source supplies power to the LED via the mains branch, when power is off, the power storage module supplies power to the LED; the driving circuit further comprises a control module which has a first signal input terminal for detecting a mains power signal and a second signal input terminal coupled to the mains branch for controlling on/off of the mains branch; when power is off, the control module turns off the mains branch, when power is on, the control module releases the control of turning off the mains branch after the emergency branch stops supplying power to the LED.

A control method of an LED emergency light, the LED emergency light comprising an LED and a driving circuit comprising an emergency branch, a mains branch and a control module, wherein the emergency branch comprising a charging circuit and a power storage module; when power is off, the power storage module supplies power to the LED, when power is on, an external power source supplies power to the LED via the mains branch and charges the power storage module via the charging circuit to store power, and the power storage module stops supplying power; wherein, the control method comprises the following steps:
when power is off, the control module turns off the mains branch; and
when power is on, the control module releases the control of turning off the mains branch after the power storage module stops supplying power to the LED.

The LED emergency light provided by the present disclosure can avoid the case that dual circuits supply power to the LED, thereby increasing the serve life of the light.

2

Figure 1A:
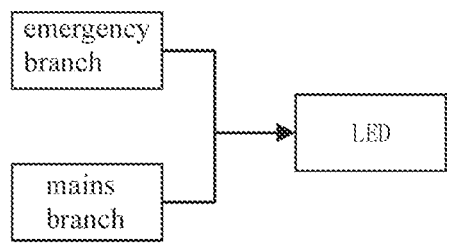
FIG. 1a is a schematic diagram of an LED emergency light in the prior art.
Figure 1B:
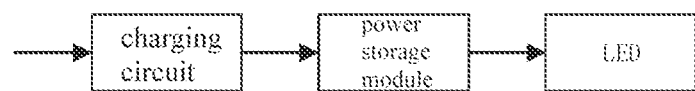
Figure 2A:
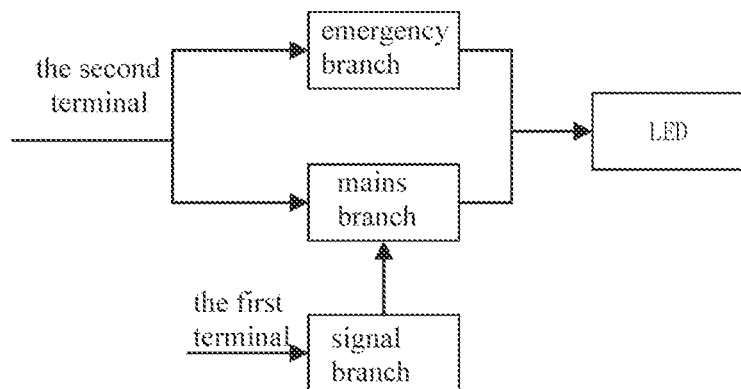
Figure 2B:
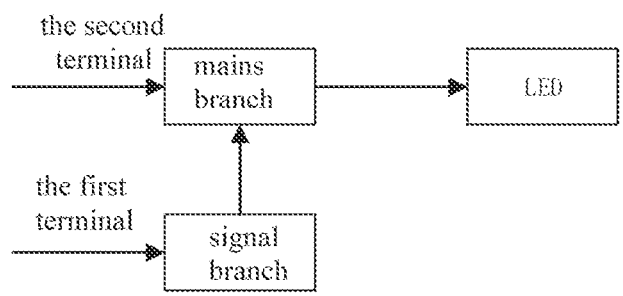
Figure 3:
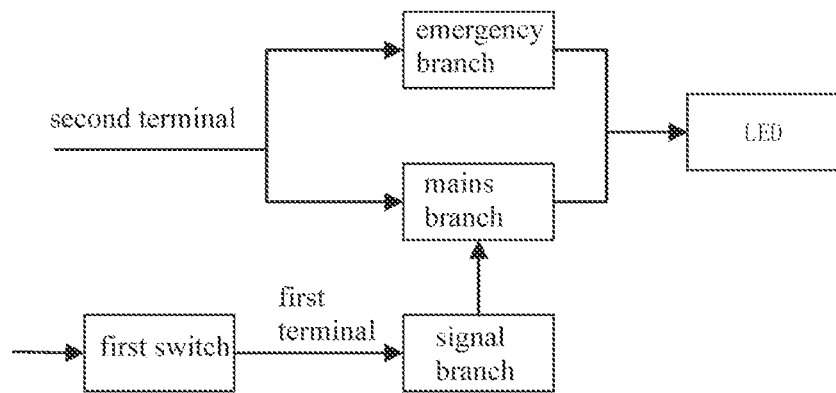
Figure 4:
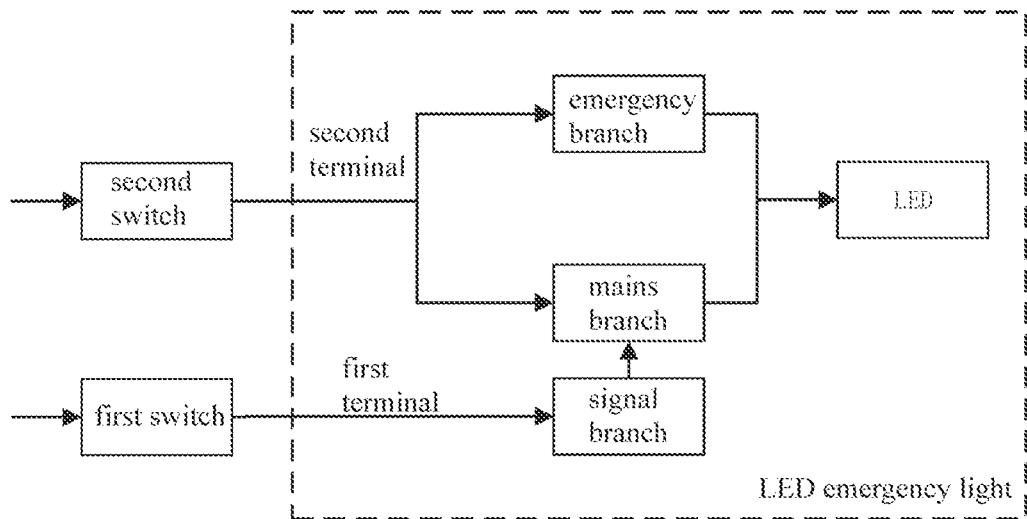
Figure 5:
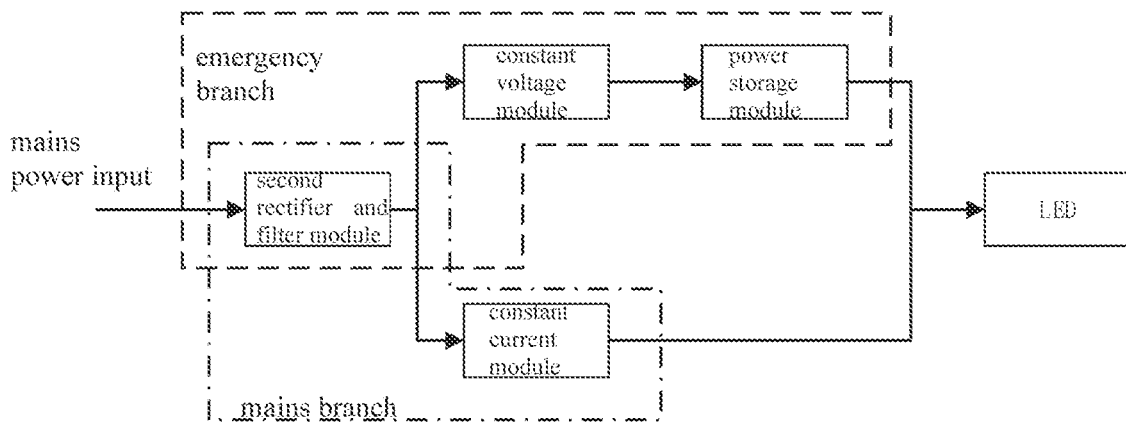
Figure 6A:
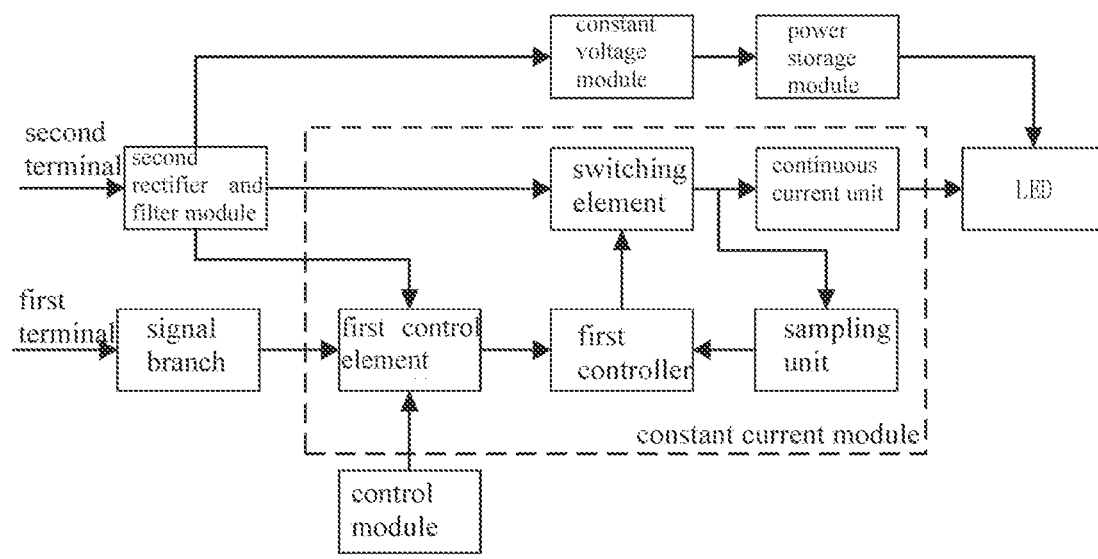
Figure 6B:
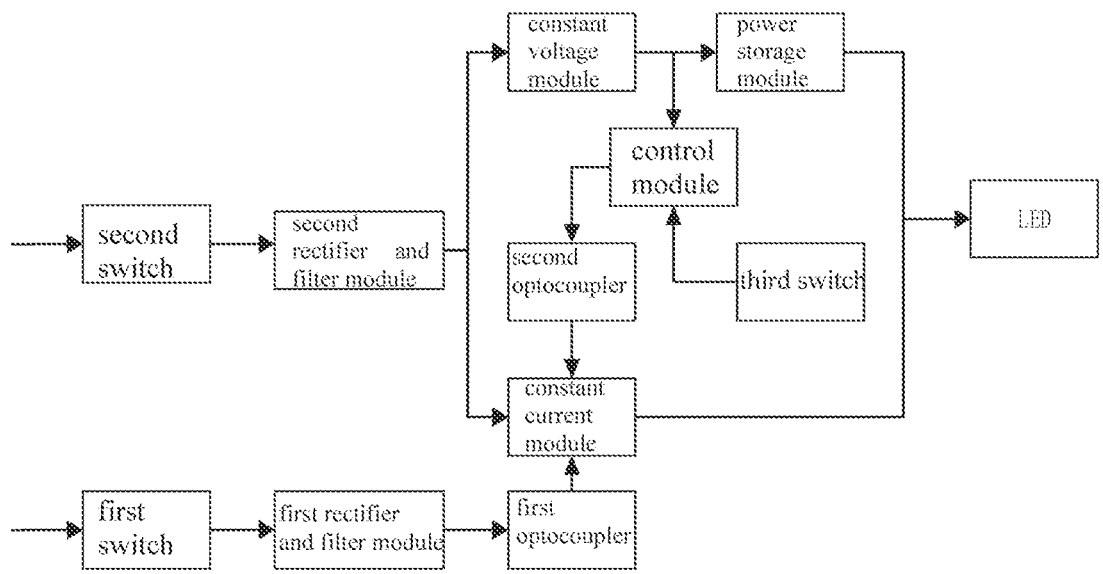
Figure 7:
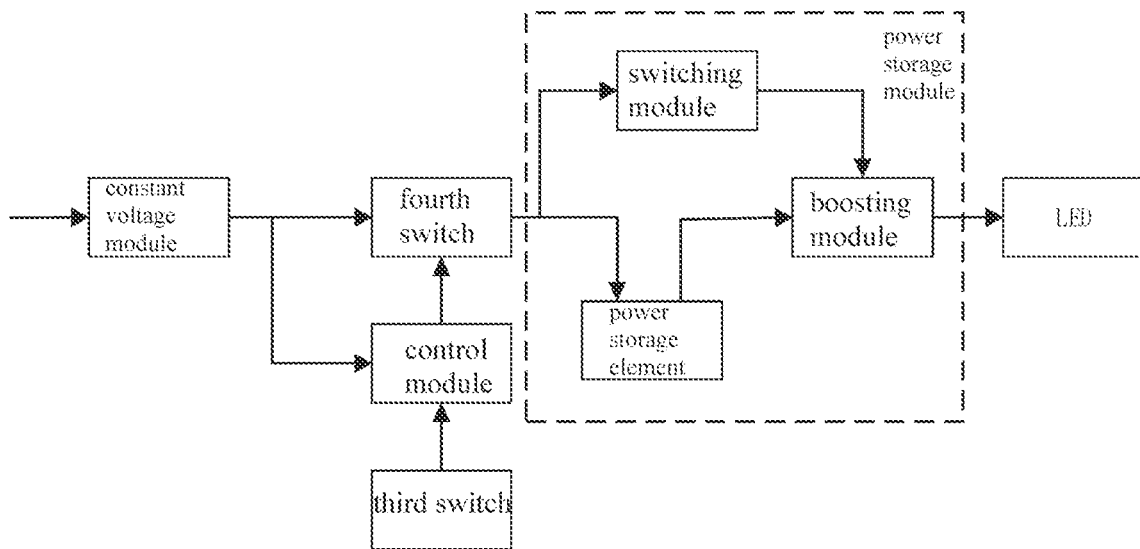
Figure 8:
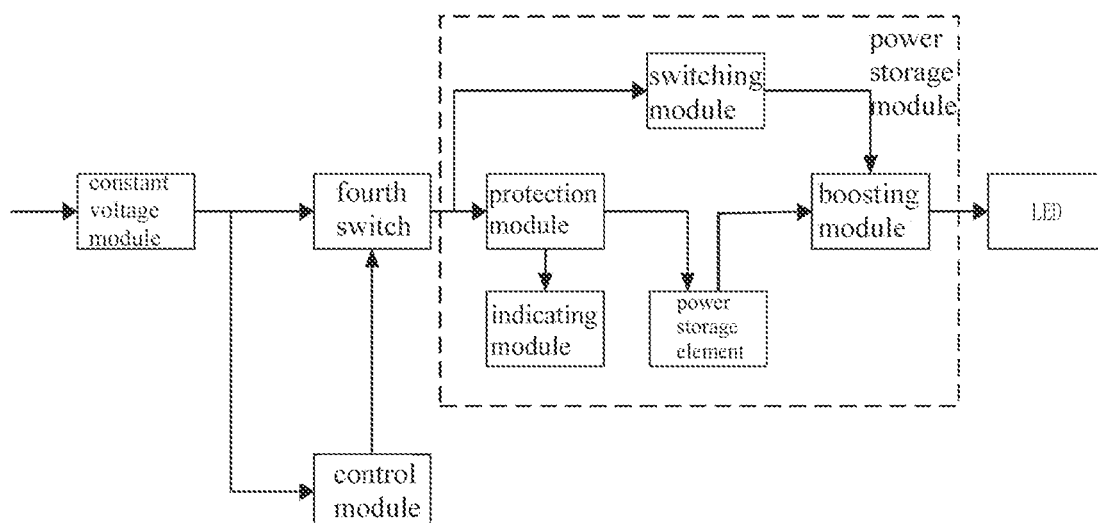
Figure 9:
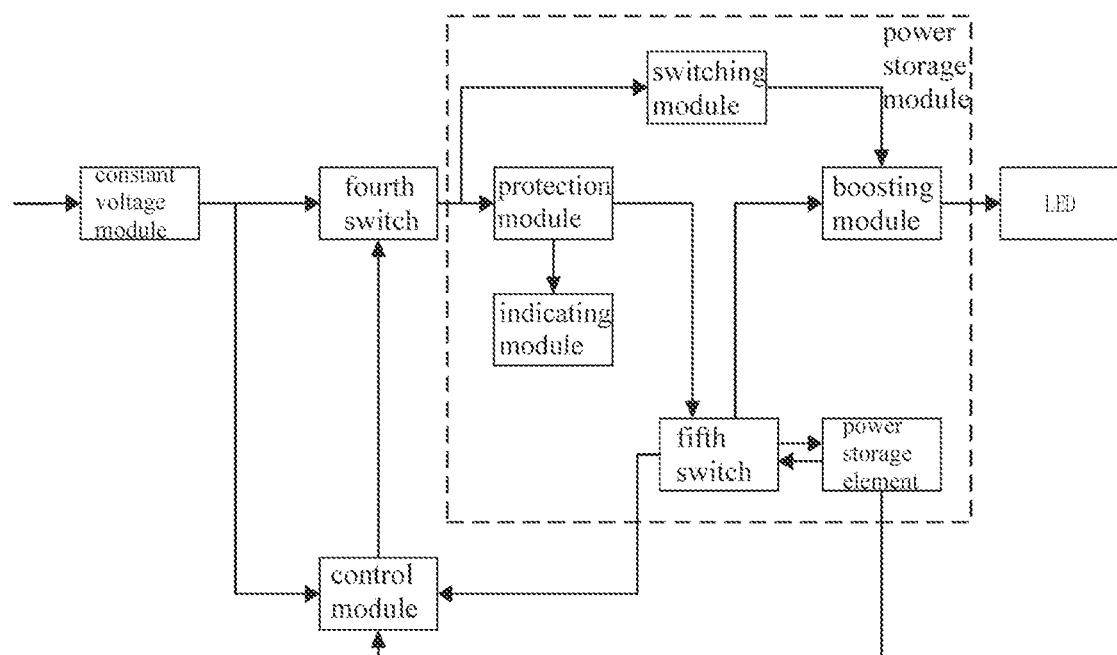
Figure 10:
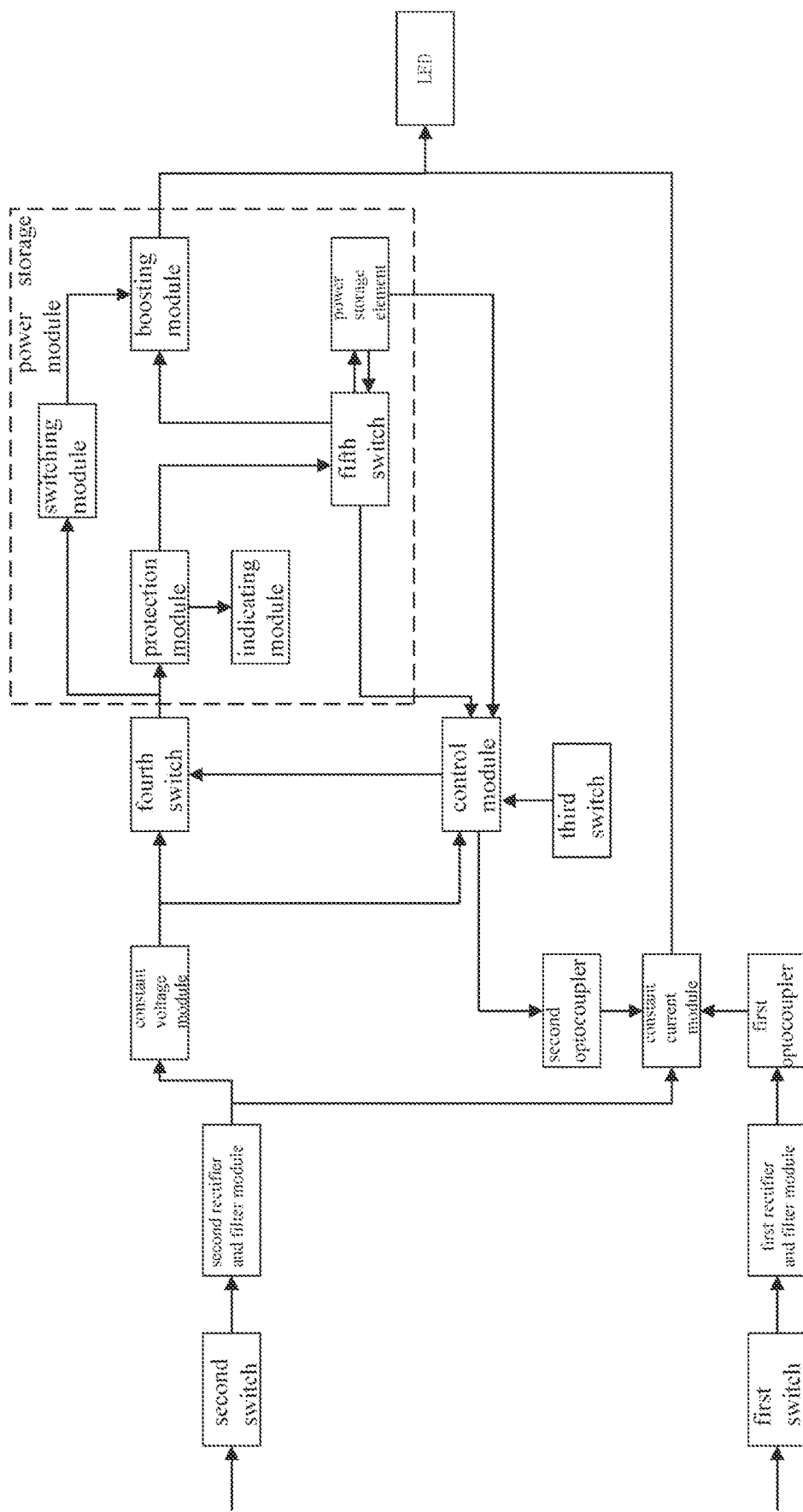
Figure 11:
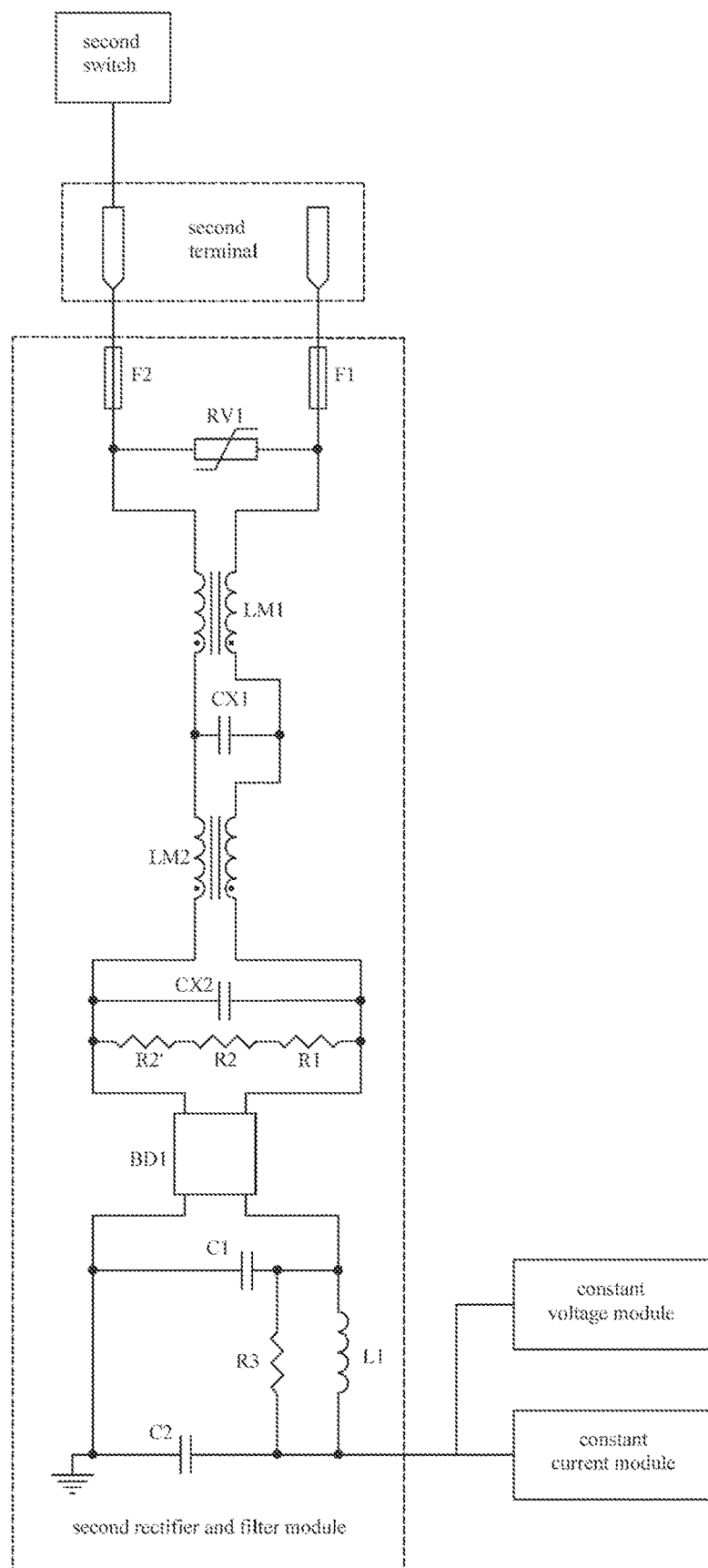
Figure 12:
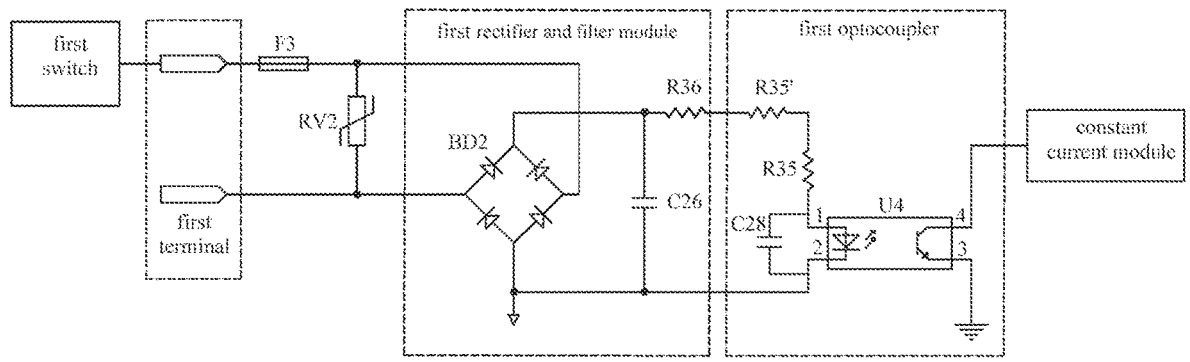
Figure 13:
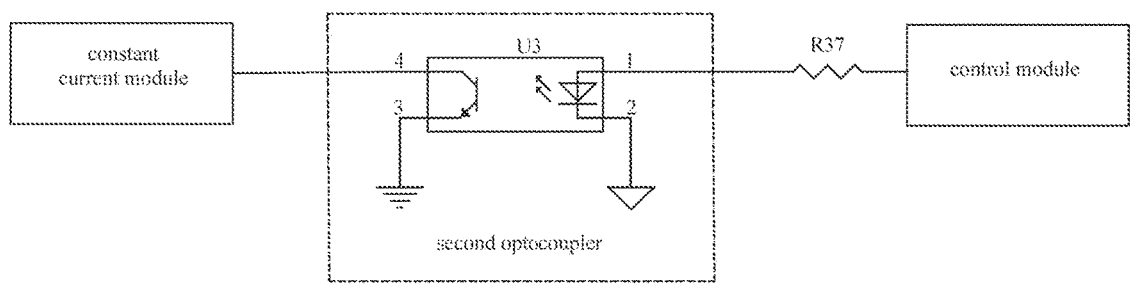
Figure 14:
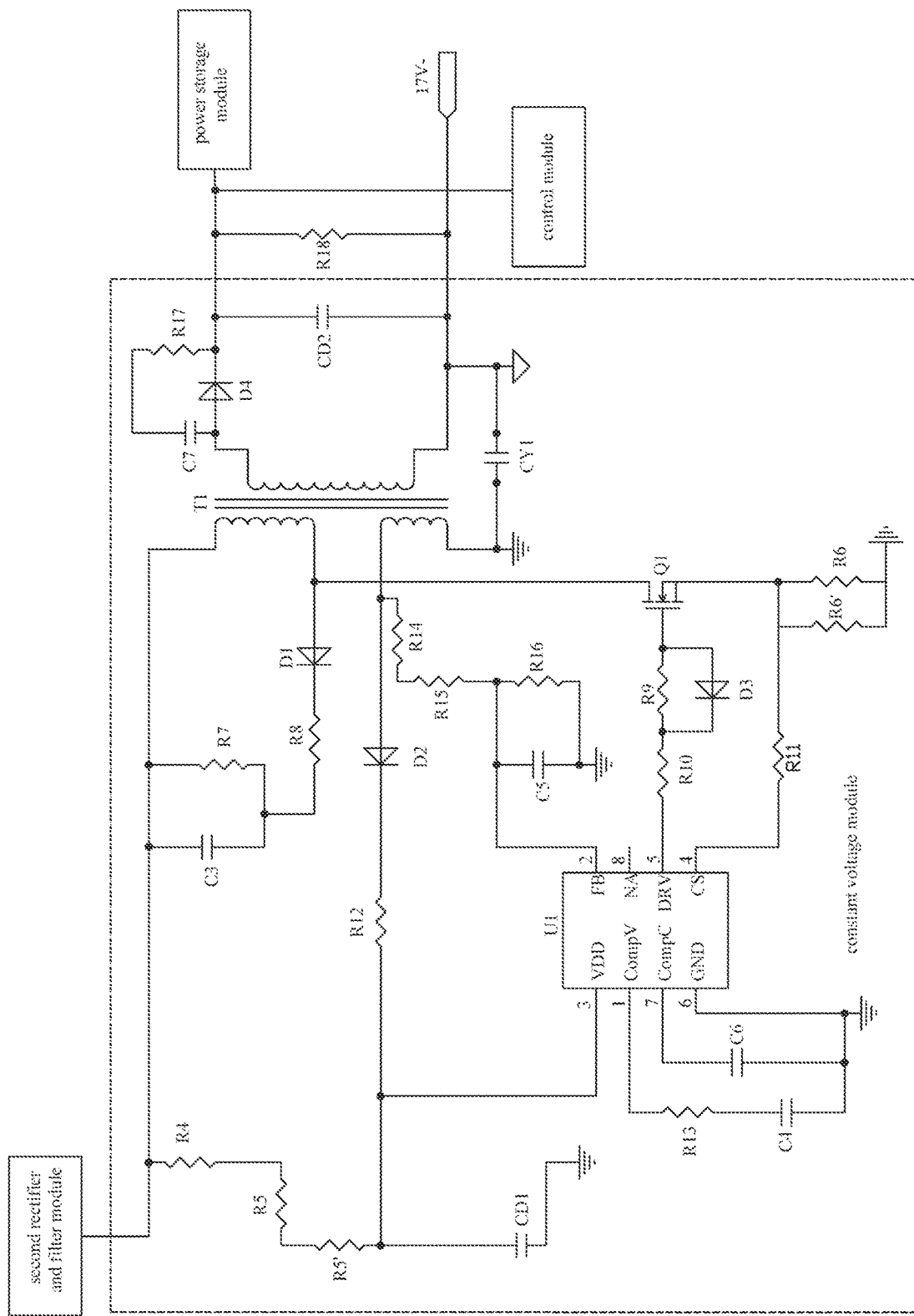
Figure 15:
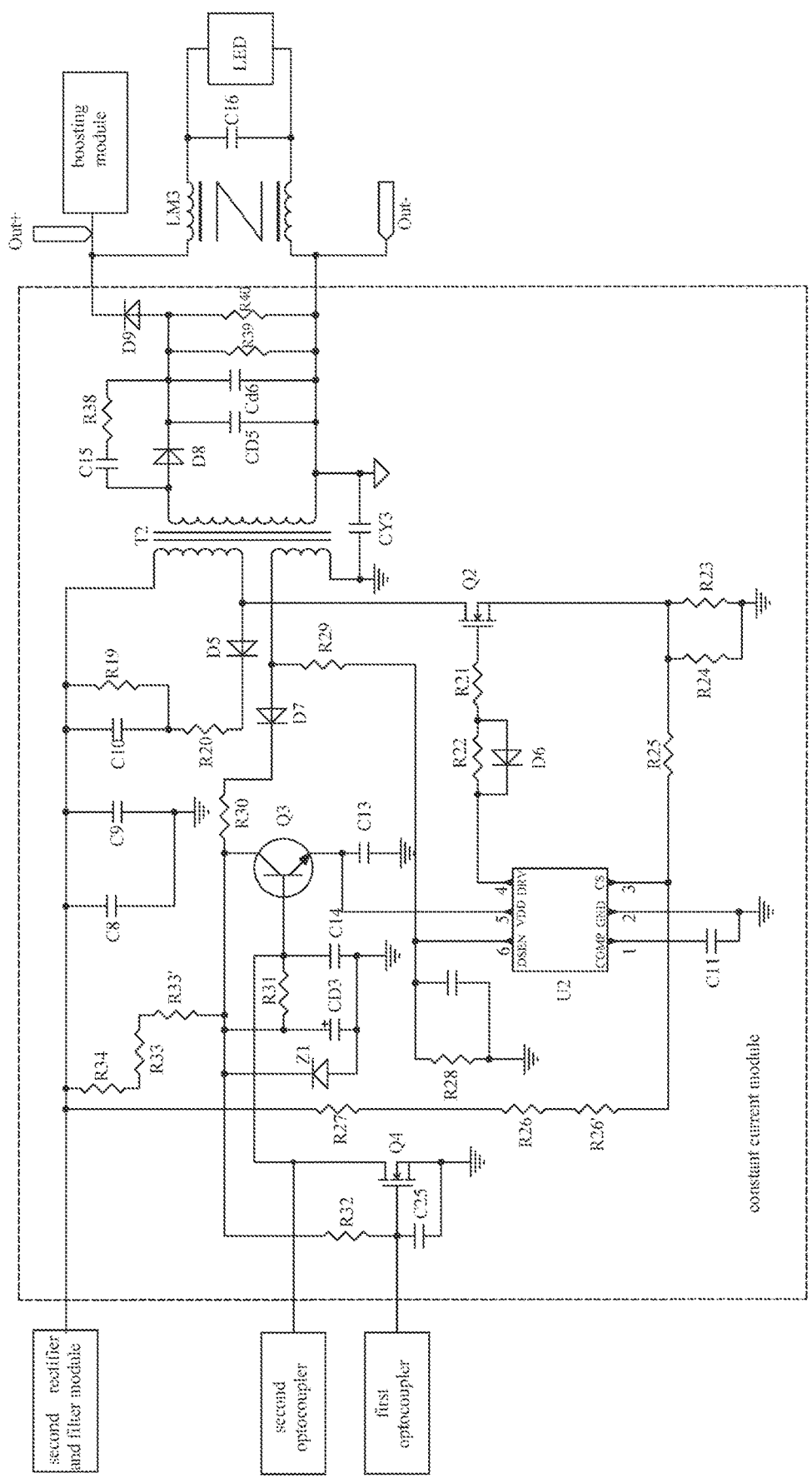
Figure 16:
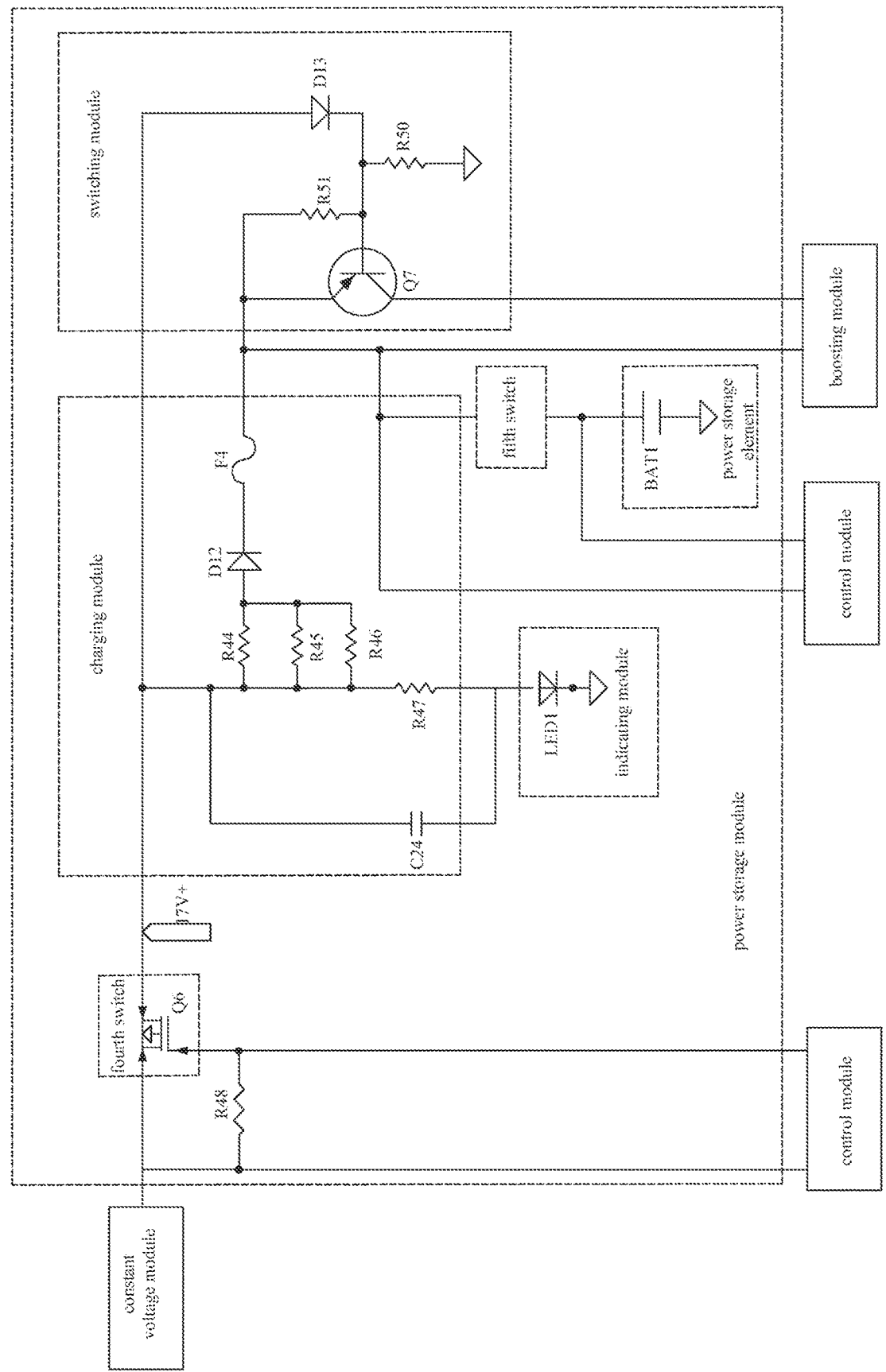
Figure 17:
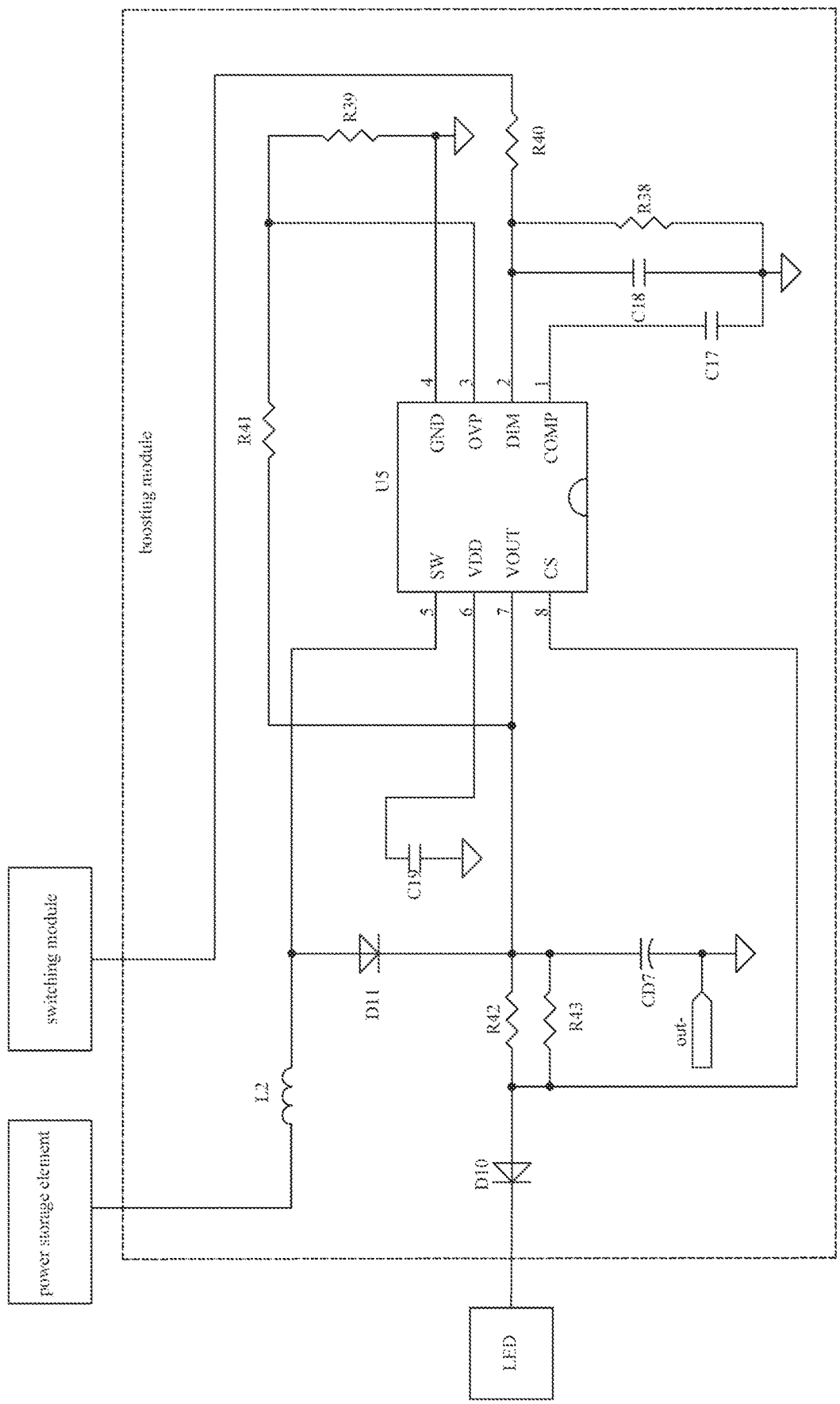
Figure 18:
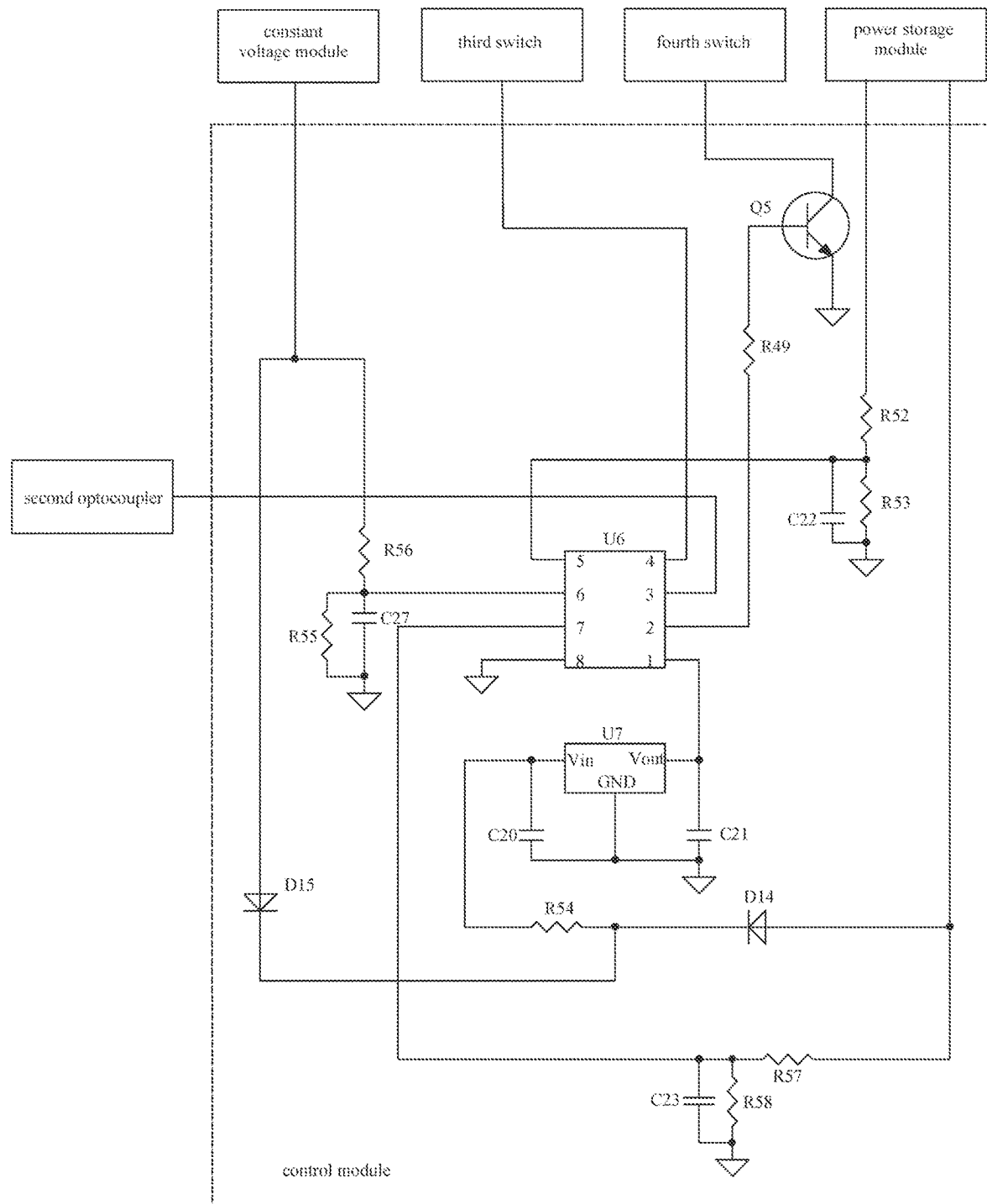
Figure 19:
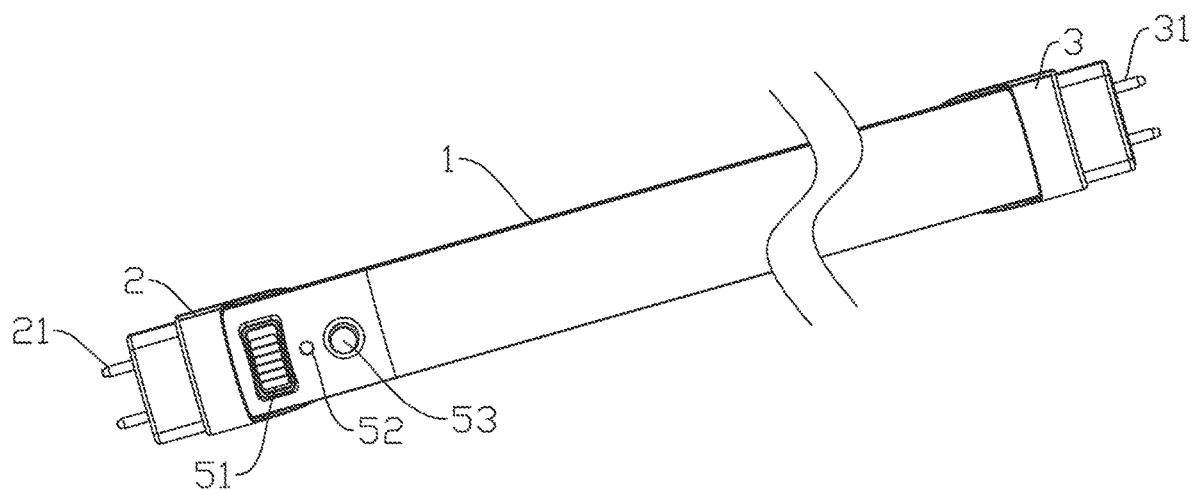
Figure 20:
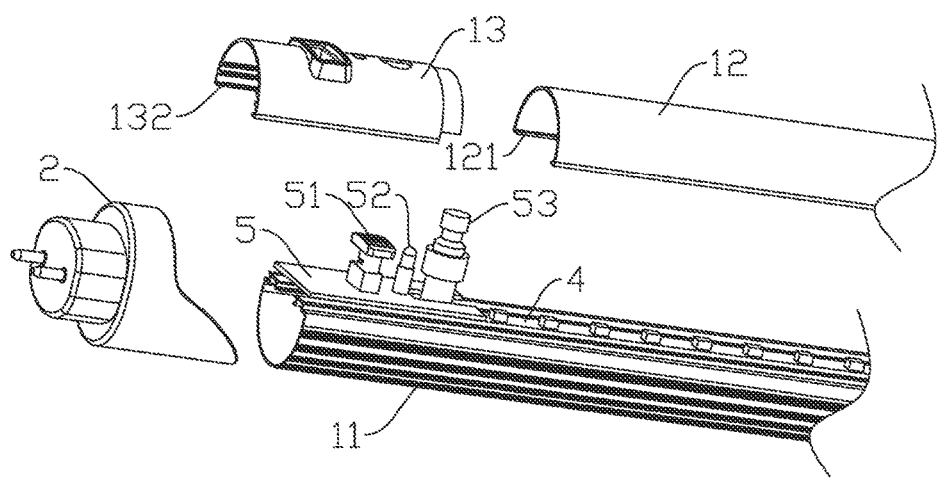
Figure 21:
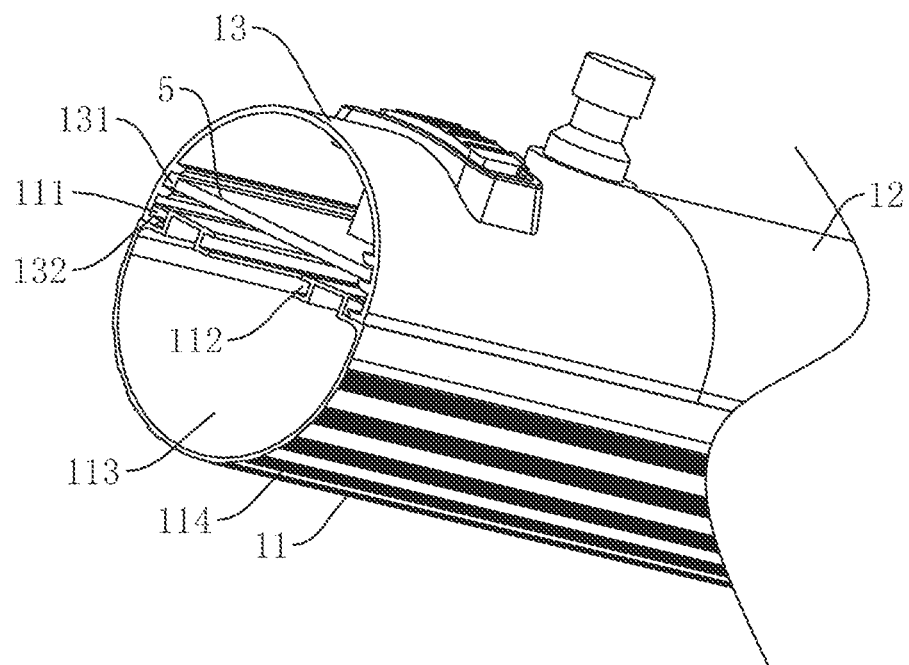
Figure 22:
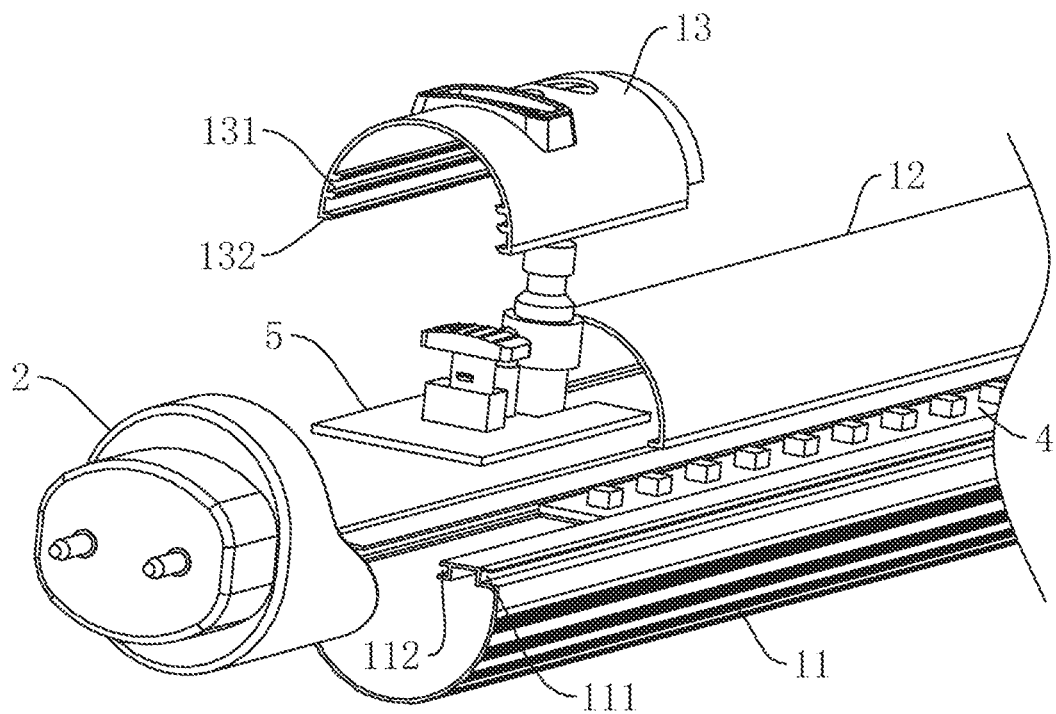
Figure 23:
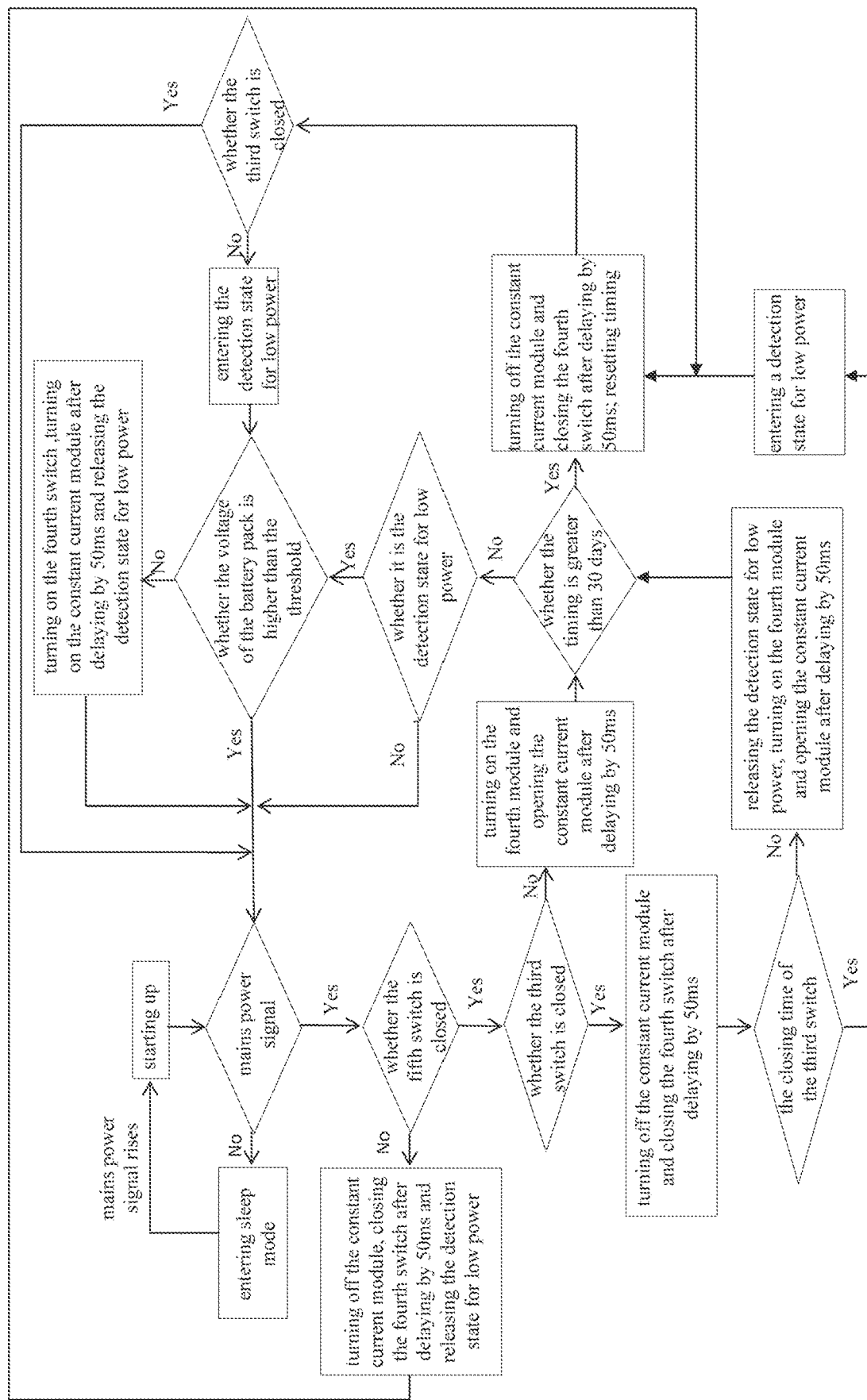
Figure 24:
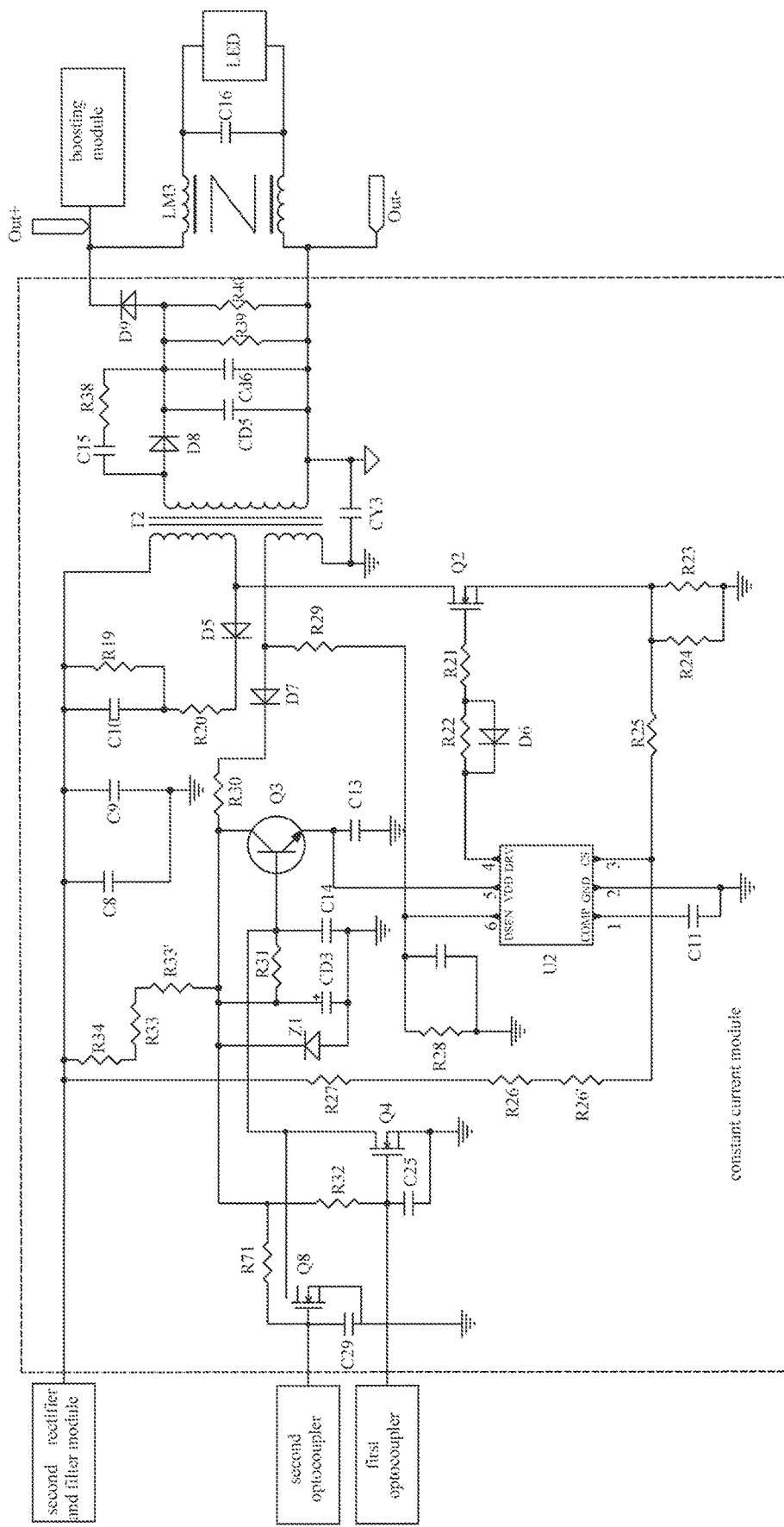

FIG. 1b is a schematic diagram of an embodiment of an emergency branch according to the present disclosure;

FIG. 2a is a schematic diagram of an embodiment of an LED emergency light according to the present disclosure;

FIG. 2b is a schematic diagram of an embodiment of an LED light according to the present disclosure:

FIG. 3 is a schematic diagram of an embodiment of a lighting system according to the present disclosure;

FIG. 4 is a schematic diagram of an embodiment of a lighting system according to the present disclosure;

FIG. 5 is a schematic diagram of an embodiment of an LED emergency light according to the present disclosure;

FIG. 6a is a schematic diagram of an embodiment of an LED emergency light according to the present disclosure;

FIG. 6b is a schematic diagram of an embodiment of an LED emergency light according to the present disclosure;

FIG. 7 is a schematic diagram of an embodiment of an LED emergency light according to the present disclosure;

FIG. 8 is a schematic diagram of an embodiment of an LED emergency light according to the present disclosure;

FIG. 9 is a schematic diagram of an embodiment of an LED emergency light according to the present disclosure;

FIG. 10 is a schematic diagram of an embodiment of a lighting system of the present disclosure;

FIG. 11 is a circuit diagram of a second rectifier and filter module of an LED emergency light according to the present disclosure;

FIG. 12 is a circuit diagram from a first switch to a constant current module of an LED emergency light according to the present disclosure;

FIG. 13 is a circuit diagram from a control module to a constant current module of an LED emergency light according to the present disclosure;

FIG. 14 is a circuit diagram of a constant voltage module of an LED emergency light according to the present disclosure;

FIG. 15 is a circuit diagram of a constant current module of an LED emergency light according to the present disclosure;

FIG. 16 is a circuit diagram of a power storage module of an LED emergency light according to the present disclosure;

FIG. 17 is a circuit diagram of a boosting module of an LED emergency light according to the present disclosure;

FIG. 18 is a circuit diagram of a control module of an LED emergency light according to the present disclosure;

FIG. 19 is a three-dimensional structure view of an LED emergency light according to the present disclosure;

FIG. 20 is a partial exploded view of an LED emergency light according to the disclosure;

FIG. 21 is a schematic view of the interior of an LED emergency light according to the disclosure;

FIG. 22 is a partial exploded view of an LED emergency light according to the disclosure;

FIG. 23 is a flow chart of a control method of an LED emergency light according to the present disclosure;

FIG. 24 is a circuit diagram of a constant current module of an embodiment of an LED emergency light according to the present disclosure.

LIST OF REFERENCE NUMERALS 1, tube body; 11, bottom case; 111, first receiving groove; 112, second receiving groove; 113, installation chamber; 114, heat dissipation rib; 12, light transmitting cover, 121, tab; 13, installation section; 131, positioning groove; 132, tab; 2, end cap; 21, pin; 3, end cap; 31, pin; 4, LED light bar; 5, circuit board; 51, fifth switch; 52, indicator light; 53, third switch.

DESCRIPTION OF THE EMBODIMENTS

The technical solutions according to the embodiments of the present disclosure will be described apparently and completely below with reference to the drawings according to the embodiments of the present disclosure. Obviously, the described embodiments are illustrated as a part of the embodiments of the present disclosure, but not exhaustive. Based on the embodiments of the present disclosure, all other embodiments obtained by a person skilled in the art without inventive efforts fall within the protection scope of the present disclosure.

It should be noted that, when a component is "connected" with another component, it may be directly connected to another component or may be indirectly connected to another component through a further component. Similarly, when a component is "provided" on another component, it may be directly provided on another component or may be provided on another component through a further component.

Unless otherwise defined, all technical and scientific terms used herein have the same meaning as commonly understood by a person skilled in the art. The terms in the description of the present disclosure are used to describe specific embodiments, and not to limit the present disclosure. The terms "and/or" used herein are intended to include one or more of the correspondingly listed options.

Referring to FIG. 1a, a driving circuit of a conventional LED emergency light includes a mains branch and an emergency branch with a power storage module. When power is on, an external power source supplies power to the LED via the mains branch, and when power is off, the power storage module supplies power to the LED.

Referring to FIG. 1b, most emergency branches further includes a charging circuit. When power is on, the external power source charges the power storage module via the charging circuit. The expressions "when power is on" or "when power is off" refer to the cases where the LED emergency light is or is not connected to the external power source. The external power source may be a DC power supply or an AC power supply.

Some existing LED emergency lights such as straight lights have two power connecting terminals which are simultaneously coupled to the mains branch. In the case where one of the two power connecting terminals is connected to the power supply, if an operator touches the other power connecting terminal, there may be a risk of electric shock.

Referring to FIG. 2a, in order to solve the above problem, an embodiment of the present disclosure provides an LED emergency light, which includes an LED and a driving circuit. The driving circuit includes a signal branch, a mains branch, and an emergency branch with a power storage module. When power is on, the external power source supplies power to the LED via the mains branch. When power is off, the power storage module supplies power to the LED. The LED emergency light has two power connecting terminals, i.e., a first terminal and a second terminal. The signal branch is coupled to the first terminal and functions to transmit external driving signals to control the on/off of the mains branch. The mains branch is coupled to the second terminal and functions to transmit power to the LED. The mains branch would not be turned on to supply power to the LED until both of the power connecting terminals are powered on, thereby avoiding the risk of electric shock.

In this embodiment, the power for operating the LED light is transmitted via the second terminal, and the first terminal can be regarded as a control terminal, which transmits the external driving signals for controlling the mains branch to be turned on or off to supply power to the LED. For example, a control element such as a switch may be provided in the mains branch, which functions to turn on or off and is controlled by the external driving signals from the first terminal.

Some LED lights with two power connecting terminals do not need emergency functions. Referring to FIG. 2b, in order to simplify the circuit, a further embodiment of the present disclosure provides an LED light, which includes an LED and a driving circuit. The LED light has two power connecting terminals, i.e., a first terminal and a second terminal. The driving circuit includes a mains branch and a signal branch, wherein the signal branch is coupled to the first terminal and functions to transmit the external driving signals to control the on/off of the mains branch, and the mains branch is coupled to the second terminal and functions to transmit power to the LED. The mains branch would not be turned on to supply power to the LED until both of the power connecting terminals are powered on.

Referring to FIG. 5, a mains branch in one embodiment includes a second rectifier and filter module and a constant current module which are coupled in sequence. After the second terminal is connected to an AC power, the AC power is rectified and filtered by the second rectifier and filter module and converted into a DC power which is supplied to the LED via the constant current module. The technique of supplying power to the LED via the constant current module is provided on the basis that the brightness of the LED is affected by the current. The constant current module itself may be a known constant current module. Alternatively, some embodiments of the present disclosure below also provide improved constant current modules.

Referring to FIG. 6a, a constant current module in one embodiment includes a continuous current unit and a switching element which are coupled between the second rectifier and filter module and the LED, and a first controller for controlling the turning on or off of the switching element. A first control element is coupled between the second rectifier and filter module and the power supplying terminal of the first controller. In the case where the first control element is turned off without receiving an external driving signal, the second rectifier and filter module is unable to supply power to the first controller, so that the switching element is turned off. The constant current module cannot functions normally, that is, it cannot supply power to the LED. Conversely, in the case where the first control element receives an external driving signal and is turned on, the constant current module is able to function normally and supply power to the LED.

The constant current module further includes a sampling unit. The sampling unit collects current signals from the output terminal of the switching element and feeds them back to the first controller, thereby controlling the turning on or off of the switching element. The switching element is generally configured as a MOS transistor.

Referring to FIG. 6b, the signal branch in one embodiment includes a first rectifier and filter unit and a first optocoupler which are coupled in sequence. The first terminal is connected to an AC power, which can be converted into a DC power by means of the first rectifier and filter module to control the mains branch. The first optocoupler functions to isolate and increase the ground resistance at both ends of the light tube, thereby avoiding electric leakage.

In one embodiment, the first terminal is connected to a DC power and coupled to the mains branch. In other words, the aforementioned first rectifier and filter module is omitted.

Referring to FIG. 5, an emergency branch in one embodiment includes a second rectifier and filter module, a constant voltage module, and a power storage module that are coupled in sequence. The second rectifier and filter module and the constant voltage module form a charging circuit, and the external power source supplies power to the power storage module via the second rectifier and filter module and the constant voltage module in sequence. In the case where the external power source is an DC power, it can be directly supplied to the power storage module without requirement for a second rectifier and filter module. The power storage module generally includes a power storage element such as a battery pack, and the charging and discharging of the power storage module can be managed well with the constant voltage module.

Referring to FIG. 5, in order to simplify the circuit, in one embodiment, the mains branch and the emergency branch share the second rectifier and filter module. In other words, the output terminal of the second rectifier and filter module supplies power to the constant voltage module and the constant current module at the same time.

In one embodiment, the power storage module has a signal input terminal for detecting the mains signal. When power is off, the power storage module supplies power to the LED, and when power is on, the power storage module stops supplying power to the LED. In one embodiment, the signal input terminal of the power storage module is coupled to the charging circuit. Alternatively, the signal input terminal of the power storage module may be coupled to the mains branch.

The LED light includes a mechanical part and a circuit part. The mechanical part does not affect the implementations of the technical solutions according to the present disclosure. However, in the present disclosure, an improved mechanical part is also provided below.

Based on the abovementioned driving circuit and LED emergency light, an embodiment of the present disclosure also provides a power supply system with an LED emergency light. It is understandable that the present disclosures described by referring to the drawings about any one of the driving circuit, the LED emergency light and the power supply system may also be regarded as the disclosure to the others of the driving circuit, the LED emergency light and the power supply system.

The power supply system with an LED emergency light in this embodiment includes the LED emergency light according to the present disclosure and AC lines that are coupled to the power connecting terminals of the LED emergency light.

Referring to FIG. 3, in one embodiment, a first switch, which is used for generating driving signals, is installed on an AC line that is coupled to the first terminal. The first switch can be triggered on site or be triggered in a remote manner. The first switch may be installed in an indoor wall, a light holder or a related electrical system.

The first switch, depending on its operating state, i.e., on or off, also determines the presence of the driving signals. For example, in the case where it is required for the LED emergency light to work, the first switch, which is normally opened, can be triggered to send driving signals to the mains branch so as to turn on the mains branch. Since the second terminal always supplies power to the LED via the mains branch, once the mains branch is turned on, the LED can be lit.

Referring to FIG. 12, the first switch is coupled to one of the pins of the first terminal, and the one of the pins of the first terminal may be further connected with a fuse F3 in series. A varistor RV2 may be connected between the two pins of the first terminal. The first rectifier and filter module includes a bridge rectifier BD2, a capacitor C26 and a resistor R36, wherein the capacitor C26 and the resistor R36 function to filter. After rectification, power is supplied to the primary side of the first optocoupler U4. The primary side of the first optocoupler is further connected with a resistor R35, a resistor R35', and a capacitor C28. The secondary side of the first optocoupler U4 is connected to the constant current module.

As the first terminal is only used for control, the capacitor of the first rectifier and filter module for filtering may be a conventional capacitor C26 instead of an electrolytic capacitor, which brings the benefits of cost-effectiveness, long service life, and low hidden safety risk.

Referring to FIG. 4, in one embodiment, a first switch, which is used for generating driving signals, is installed on an AC line that is coupled to the first terminal, and a second switch, which is used for cutting off the mains power to switch the driving circuit into a model of supplying power from the power storage module to the LED, is installed on an AC line that is coupled to the second terminal.

The second switch, depending on its operating state, i.e., on or off, directly determines the power supply of the mains branch. In the case where a real-time power supply is required, the second switch may be normally closed. The emergency branch can be actively detected with the second switch. In particular, the second switch may be turned off (i.e., cutting off the second terminal) to stop supplying power via the mains branch, so that the power storage module directly supplies power to the LED, thereby pre-detecting whether the emergency branch can operate normally.

In one embodiment, the second switch is a normally-closed switch. The second switch may be installed in an indoor wall, a light holder or a related electrical system.

Referring to FIG. 11, the second switch is coupled to one of the pins of the second terminal, and each of the pins of the second terminal may be further connected with a fuse f1 and a fuse f2 in series, respectively. A varistor RV1 may be further connected between the two pins of the second terminal. Power is then supplied to the first EMI filter circuit, which specifically includes an inductance LM1, an inductance LM2, a capacitor CX1, a capacitor CX2, a resistor R1, a resistor R2, and a resistor R2', and then supplied to the bridge rectifier BD1 for rectification, and then supplied to the second EMI filter circuit, which specifically includes an inductance L, a resistance R3, a capacitance C1, and a capacitance C2. After filtering, power is supplied to the constant current module and the constant voltage module.

In one embodiment, the constant current module includes a first transformer. The primary side of the first transformer is coupled to the second rectifier and filter module, and the on/off of the primary side of the first transformer is controlled by the first controller. In one embodiment, the first controller is powered by the second rectifier and filter module. In one embodiment, the first controller is further regulated and powered by the secondary side of the first transformer. In one embodiment, a first control element is coupled between the second rectifier and filter module and the power supplying terminal of the first controller, which is controlled by the driving signal from the first terminal.

Referring to FIG. 15, the constant current module includes a first transformer T2. The primary side of the first transformer T2 is connected in series with a MOS transistor Q2, and the gate of the MOS transistor Q2 is connected to and controlled by the first controller U2. For example, the first controller U2 may be configured as a MT7933 chip.

A pin 5 of the first controller U2 is configured as the power supplying terminal, and the second rectifier and filter module supplies power to the pin 5 through a resistor R34, a resistor R33, a resistor R33', and a triode Q3 in sequence. Power is supplied to the pin 5 via a diode D7, a resistor 30 and a triode Q3 after being regulated by the secondary side of the first transformer T2.

In the initial stage of power-on, the first controller U2 is directly powered by the second rectifier and filter module. After the first transformer T2 becomes stable, power is regulated and supplied by the secondary side so as to further ensure the stability of the operation and the power supply.

The triode Q3 may be regarded as the first control element, and the on/off of the triode Q3 is also related to the driving signal from the first terminal, i.e., the signal of the first optocoupler.

After power is on, due to an electrolytic capacitor CD3 which absorbs and storage power, the voltage at the left side (in the direction of the figure) of the resistor R31 rises with a slight delay. After the MOS transistor Q4 is turned on, the base of the triode Q3 is grounded, so that the triode Q3 cannot supply power to the first controller U2, which means that the constant current module is turned off and out of work.

If the first switch is triggered, the first optocoupler will input a low level to the gate of the MOS transistor Q4 to turn off the MOS transistor Q4, and thus the voltage of the base of the triode Q3 will rise so that the triode Q3 will be turned on to supply power to the first controller U2, which means that the constant current module will operate normally to supply power to the LED.

In one embodiment, the constant voltage module includes a second transformer. The primary side of the second transformer is coupled to the second rectifier and filter module, and the on/off of the primary side of the second transformer is controlled by the second controller. In one embodiment, the second controller is powered by the second rectifier and filter module. In one embodiment, the second controller is further regulated and powered by the secondary side of the second transformer.

Referring to FIG. 14, the constant voltage module includes a second transformer T1. The primary side of the second transformer is connected in series with a MOS transistor Q1, and the gate of the MOS transistor Q1 is connected to and controlled by the second controller U1. For example, the second controller U1 may be configured as a MT7990 chip.

A pin 3 of the second controller U1 is configured as a power supplying terminal, and the second rectifier and filter module supplies power to the pin 3 through a resistor R4, a resistor R5, and a resistor R5' in sequence. Power is supplied to the pin 3 via a diode D2 and a resistor 12 after being regulated by the secondary side of the second transformer T1.

In the initial stage of power-on, the second controller U1 is directly powered by the second rectifier and filter module. After the second transformer T1 becomes stable, power is regulated and supplied by the secondary side so as to further ensure the stability of the operation and the power supply.

Referring to FIG. 6a, in one embodiment, the driving circuit further includes a control module coupled to the mains branch for obtaining or releasing the control of turning off the mains branch. In one embodiment, the control module is coupled to the constant current module of the mains branch for obtaining or releasing the control of turning off the constant current module.

The control module controls the mains branch by means of the constant current module, which controls the constant current module prior to the driving signal or releases the control. When the control module obtains the control of turning off, the driving signal can be shielded; in other words, the first switch no longer works. When the control module releases the control of turning off, the first switch can operate normally for opening and closing operations.

Referring to FIG. 6b, in one embodiment, the control module is coupled to the constant current module via the second optocoupler. In one embodiment, the control of turning off occurs prior to the control to the constant current module by the driving signal; in other words, the control of turning off occurs prior to the on/off control to the constant current module by the first switch.

Referring to FIG. 13, the control module is connected to the primary side of the second optocoupler U3 via a resistor R37, and the secondary side of the second optocoupler U3 is connected to the constant current module. When the second optocoupler U3 is triggered by the control module, a low-level signal is allowed to input into the constant current module. Referring to the above-described, the low-level signal is input into the base of the triode Q3 so that the triode Q3 cannot supply power to the first controller U2, which means that the control module obtains the control of turning off to the constant current module; in other words, the control module turns off the constant current module, regardless of whether the first optocoupler has a signal.

When the second optocoupler U3 does not input a low-level signal, the control of turning off is released. In this case, as described above, the on/off of the triode Q3 is related to the on/off of the MOS transistor Q4 and the signal of the first optocoupler.

Referring to FIG. 24, the second optocoupler U3 is coupled to the power supplying terminal of the first controller U2 via a MOS transistor Q8. The gate of the MOS transistor Q8 is coupled to the secondary side of the second optocoupler U3, the drain of the MOS transistor Q8 is grounded, and the source of the MOS transistor Q8 is coupled to the base of the triode Q3.

When the control module sends a low level to the primary side of the second optocoupler U3, the secondary side of the second optocoupler U3 is turned off, and the voltage of the gate of the MOS transistor Q8 changes; in other words, the second optocoupler U3 sends a high level to the gate of the MOS transistor Q8 to turn on the MOS transistor Q8, the base of the triode Q3 is therefore grounded, so that the triode Q3 cannot supply power to the first controller U2, which means that the control module obtains the control of turning off to the constant current module; in other words, the control module turns off the constant current module, regardless of whether the first optocoupler has a signal.

This avoids a weak leakage current which may occur in the case where the control module is asleep. The leakage current may be mistaken for a high-level output current and thus may trigger the second optocoupler U3, thereby turning off the constant current module. In the case where a MOS transistor is connected between the second optocoupler U3 and the base of the triode Q3, a signal can be sent only if the control module outputs a low level, so that even if the control module has a leakage current, the output high level will not affect the constant current module.

Referring to FIG. 6b, in one embodiment, the control module is further coupled with a third switch for instructing the control module to turn off the mains branch and thus stop supplying power to the LED and to turn on the emergency branch to supply power to the LED.

The third switch can also serve as a test switch for detecting whether the emergency branch can respond normally. The control module turns off the mains branch by turning off the constant current module through the second optocoupler. In practice, as the mains power is generally connected, the control module will also send a signal to the emergency branch to power the LED.

In one embodiment, the emergency branch is provided with a control element such as a switch that controls the charging circuit to charge the power storage module. The control element is also controlled by the control module. When the control module turns off the emergency branch by means of the control element, the charging circuit cannot charge the power storage module, and the power storage module supplies power to the LED.

In one embodiment, the third switch is configured as a normally open switch so that it would not affect the normal operation of the LED emergency light. In one embodiment, the third switch is installed on the light tube, which is convenient for control and an on-site operation.

Referring to FIG. 18, the control module may be configured as a microcontroller U6, and the third switch is connected to a pin 4 of the microcontroller U6. After the third switch is triggered, the microcontroller U6 sends a signal to the second optocoupler via the pin 3 to turn off the constant current module.

In order to avoid that the emergency branch and the mains branch supply power to the LED at the same time (i.e., a simultaneous-turning-on phenomenon), the constant current module and the emergency branch for supplying power to the LED can be turned on or off in order, that is, the output time of the constant current module in operation is different from that of the emergency branch in operation. The second rectifier and filter module described in the foregoing embodiment which is shared by the mains branch and the emergency branch ensures the consistency of the time difference.

In one embodiment, in the case where it is required for the mains branch to supply power, the control module first turns off the emergency branch to supply power to the LED, and then releases the control of turning off to the constant current module; in the case where it is required for the emergency branch to supply power, the control module first turns off the constant current module to supply power to the LED and obtains the control of turning off to the constant current module, and then turns on the emergency branch to supply power to the LED.

After the control of turning off to the constant current module is released, the first switch can be normally connected to control the constant current module. If there is no timing control, once the first switch is triggered, the emergency branch and the mains branch may supply power to the LED at the same time. Therefore, the emergency branch should be first turned off and thus stop supplying power to the LED. Similarly, when the emergency branch supplies power, the constant current module should be first turned off.

Referring to FIG. 7, in one embodiment, the power storage module includes:

a power storage element, which is coupled to the constant voltage module for supplying power through the constant voltage module;

a boosting module, which is coupled to the power storage element for boosting the output voltage of the power storage element to supply power to the LED; and a switching module for detecting the output voltage of the constant voltage module to control the operation of the boosting module.

In one embodiment, a fourth switch is coupled between the constant voltage module and the power storage module. The control module actively controls the on/off of the charging circuit of the emergency branch by controlling the on/off of the fourth switch. In one embodiment, the fourth switch is configured as a normally closed switch. The fourth switch may be configured as a MOS transistor or other circuit devices that can be turned on or off. In one embodiment, the power storage element may be configured as a capacitor, a battery pack, or other circuit devices that can storage power. For example, in the case of adopting the battery pack, the charging and discharging management module and the temperature monitoring management module of the battery pack can be further configured using conventional technologies.

Referring to FIGS. 16 and 18, a pin 2 of the microcontroller U6 of the control module is configured as a signal output terminal and can control the on/off of the triode Q5 via a resistor R49. The fourth switch is configured as a MOS transistor Q6, and the gate of the MOS transistor Q6 is connected to the collector of the triode Q5. The microcontroller U6 controls the on/off of the MOS transistor Q6 through the on/off of triode Q5. Normally, the triode Q5 is turned on, and the gate of the MOS transistor Q6 is at a low level (that is, the MOS transistor Q6 is also turned on). When it is required to turn off the MOS transistor Q6, the microcontroller U6 turns off the triode Q5, so that the level of the gate of the MOS transistor Q6 rises; that is, the MOS transistor Q6 is turned off.

The power storage element is configured as a battery pack BAT1. Once the MOS transistor Q6 is turned on, the battery pack BAT1 can be charged. When the battery pack BAT is discharged, power is input into the boosting module and then boosted to power the LED.

Referring to FIG. 8, in one embodiment, a protection module is further coupled between the output terminal of the fourth switch and the power storage element, and an indicating module that displays information during charging is also coupled to the output terminal of the fourth switch.

In one embodiment, the displaying information may be at least one of acoustic signal and optical signal. In one embodiment, the indicating module includes a light emitting diode. The indicating module is not directly connected in parallel with the power storage element, which can avoid extra power consumption when the power storage element is discharged. In one embodiment, the protection module at least includes a shunt resistor, a diode connected in series for preventing backflow, and a fuse connected in series. In one embodiment, the indicating module is coupled to the anode of the diode, and the cathode of the diode is coupled to the power storage element.

Referring to FIG. 9, in one embodiment, the protection module and the boosting module are coupled to the power storage element via a fifth switch.

In one embodiment, the fifth switch is installed on the light tube and serves as a switch for turning on or off the charging of the power storage element.

The fifth switch can directly control the charging and discharging of the power storage element. For example, during transportation or storage before installation and use, the fifth switch may be turned off. During routine use, the fifth switch is turned on. The battery pack BAT1 is connected to the boosting module via the fifth switch for emergency power supply.

Referring to FIG. 16, the fourth switch is configured as a MOS transistor Q6, and the output terminal of the fourth switch is connected to an indicating module which is configured as a light emitting diode LED1 through a resistor R47 of the protection module. The resistor R47 is further connected with a capacitor C24 in parallel.

The output terminal of the fourth switch charges the battery pack BAT1 via a resistor R44 which is connected with a resistance R45 and a resistor R46 in parallel, a diode D12, a fuse f4, and the fifth switch of the protection module.

The diode D12 which is provided between the indicating module and the power storage element can prevent the power storage element from supplying power to the indicating module when discharging, thereby reducing power consumption, without affecting the displaying of charging.

In one embodiment, the switching module includes a second control element. The control terminal of the second control element is coupled to the output terminal of the fourth switch for detecting voltage, and the output terminal of the second control element is coupled to the boosting module. In one embodiment, the input terminal of the boosting module is coupled to the power storage element, and the boosting module uses an inductor to boost. In one embodiment, the boosting module includes a third controller, and the inductor is coupled to the third controller to provide boosted power. The output terminal of the second control element is coupled to the third controller to instruct the third controller to operate.

Referring to FIGS. 16 and 17, the second control element is configured as a triode Q7. In the case where the mains power is connected, the output terminal of the fourth switch (i.e., the MOS transistor Q6) is connected to the base of the triode Q7 via the diode D13. The triode Q7 is therefore turned off, and a control signal cannot be sent to the boosting module. In the case where the mains power is disconnected, the triode Q7 is turned on, and the control signal can be sent to the boosting module for boosting power.

A third controller U5, for example, is configured as a MT7282 chip. The power storage element is connected to a pin 5 of the third controller U5 via an inductor L2, and the triode Q7 is connected to a pin 2 of the third controller U5 via a resistor R40. When the triode Q7 is turned on, the third controller U5 receives the signal and outputs an oscillation signal through the pin 5 to boost the inductor L2, and then supplies power to the LED via a diode D11, a resistor R42 (which is connected with a resistor R43 in parallel) and a diode D10 in sequence.

The switching module of the present disclosure has a simple circuit without a capacitor, which shortens the switching time between emergency lighting and normal lighting.

Referring to FIG. 10 and FIG. 18, in one embodiment, the control module includes a microcontroller, and the power supplying terminal of the microcontroller is coupled to the output terminal of the constant voltage module and the power storage element at the same time.

In one embodiment, the control module further includes a voltage stabilizing unit. The output terminal of the constant voltage module and the power storage element are simultaneously coupled to the input terminal of the voltage stabilizing unit, and the output terminal of the voltage stabilizing unit is coupled to the power supplying terminal of the microcontroller.

The constant voltage module and the power storage element can supply power to the control module at the same time. A pin 1 of the microcontroller U6 is configured as a power supplying terminal, and the output terminal of the voltage stabilizing unit U7 is connected to the pin 1.

The output terminal of the constant voltage module is connected to the input terminal of the voltage stabilizing unit U7 via a diode D15 and a resistor R54 in sequence, and the power storage element is connected to the input terminal of the voltage stabilizing unit U7 via a diode D14 and a resistor R54 in sequence, which form a dual-power-supply system and ensure that the microcontroller can operate normally in various conditions.

When the power storage element has power and the mains power is available, they supply power at the same time, and when the power storage element is out of power, the mains power is connected, which ensures that the microcontroller can operate normally after the power storage element is discharged in an emergency state and the mains power is restored.

The output terminal of the voltage stabilizing unit U7 is further grounded via a capacitor C21, and the input terminal of the voltage stabilizing unit U7 is further grounded via a capacitor C20.

In order to collect a corresponding signal, in one embodiment, the output terminal of the constant voltage module is further coupled to a first signal input terminal of the microcontroller for the control module to detect the mains power signal.

A pin 6 of the microcontroller U6 is configured as the first signal input terminal. The output terminal of the constant voltage module is connected to the pin 6 via a resistor R56. The pin 6 detects the mains power signal, and when power is disconnected, the microcontroller sends a corresponding signal to the fourth switch. The pin 6 is further grounded via a resistor R55 and a capacitor C25, respectively.

In one embodiment, the microcontroller is coupled to the control terminal of the fourth switch through a first signal output terminal. A pin 2 of the microcontroller U6 is configured as the first signal output terminal. In one embodiment, the power storage element is further coupled to the second signal input terminal of the microcontroller for the control module to detect the voltage of the power storage element. A pin 7 of the microcontroller U6 is configured as a second signal input terminal, which can reflect the voltage of the power storage element, and can manage the charging and discharging when the voltage is too high or too low.

In one embodiment, two terminals of the fifth switch are coupled to the second signal input terminal and the third signal input terminal of the microcontroller, respectively, for the control module to detect and compare the voltages of two terminals of the fifth switch. One terminal of the fifth switch connected to the power storage element is connected to the pin 7 of the microcontroller U6 via a resistor R57, and the pin 7 is further grounded via a resistor R58 and a capacitor C23, respectively. The other terminal of the fifth switch is connected to the third signal input terminal (i.e., pin 5) of the microcontroller U6 via a resistor R52, and the pin 5 is further grounded via a resistor R53 and a capacitor C22, respectively. If the input signals of the second signal input terminal and the third signal input terminal are the same, the fifth switch is turned on. If the voltages of the second signal input terminal and the third signal input terminal are different, the fifth switch is turned off. In one embodiment, the microcontroller is coupled to the second optocoupler through the second signal output terminal. A pin 3 of the microcontroller U6 is configured as the second signal output terminal.

The control module includes a microcontroller and peripheral circuits connected to the pins of the microcontroller. The peripheral circuits are mainly used for processing signals and powers to meet the requirements of the microcontroller. Therefore, the power supplying terminal, the signal input terminal and the signal output terminal of the control module are equivalent to the power supplying terminal, the signal input terminal and the signal output terminal of the microcontroller, respectively.

Referring to FIG. 19 to FIG. 22, an embodiment of the present disclosure provides an LED straight light, which includes a light tube, an LED light bar 4 and a driving circuit that are installed in the light tube. The light tube includes a tube body 1, and end caps 2 and 3 that are fixed at the two ends of the tube body 1, respectively. Each end cap is fixed with two pins. For example, the end cap 2 is fixed with two pins 21, and the end cap 3 is fixed with two pins 31, which form two power connecting terminals, respectively.

With reference to the foregoing embodiments, the driving circuit includes a signal branch, a mains branch, and an emergency branch having a power storage module. When power is disconnected, the power storage module supplies power to the LED, and when power is connected, the external power source supplies power to the LED via the mains branch. The signal branch is coupled to the pins at one end of the light tube and functions to transmit the driving signal to control the on/off of the mains branch. The mains branch is coupled to the pins at the other end of the light tube and functions to transmit power to the LED light bar.

In one embodiment, the control module is further coupled with a third switch 53 for instructing the control module to turn off the mains branch and thus stop supplying power to the LED light bar 4 and to turn on the emergency branch to supply power to the LED light bar 4. A first circuit board is provided within the light tube, and the third switch 53 is fixed on the first circuit board. The light tube is provided with a dodging opening, and a control button for the third switch 53 is exposed outside at the dodging opening.

In one embodiment, the emergency branch includes a power storage element. The power storage element is coupled to a fifth switch 51 that controls charging and discharging. A second circuit board is provided within the light tube, and the fifth switch 51 is fixed on the second circuit board. The light tube is provided with a dodging opening, and a control button for the fifth switch 51 is exposed outside at the dodging opening.

In one embodiment, the emergency branch is provided with an indicator light 52 coupled to the power storage element and displaying information during charging. A third circuit board is provided within the light tube, and the indicator light 52 is fixed on the third circuit board. The light tube is provided with a dodging opening or a transparent area, and the indicator light 52 is exposed outside at the dodging opening or located at a position corresponding to the transparent area.

In one embodiment, all the dodging openings are communicated to each other or spaced-apart from each other.

In one embodiment, all the circuit boards are integrated into one single piece such as the circuit board 5.

Referring to FIGS. 19-22, an embodiment of the present disclosure further provides an LED light, which includes a light tube, and an LED light bar 4 and a driving circuit that are installed in the light tube. The driving circuit may use conventional technology. However, the driving circuit is preferably configured as any one of the driving circuits in the foregoing embodiments.

The light tube includes a tube body 1, and end caps 2 and 3 fixed at two ends of the tube body, respectively. Each end cap is respectively fixed with two pins. For example, the end cap 2 is fixed with two pins 21, and the end cap 3 is fixed with two pins 31.

In one embodiment, the tube body 1 includes a bottom case 11 and a light transmitting cover 12 which are radially engaged with each other. The outer walls of the bottom case 11 on the opposite sides in the radial direction are provided with respective first receiving grooves 111, and the inner walls of the bottom case 11 on the opposite sides in the radial direction are provided with respective second receiving grooves 112. The inner walls of the light transmitting cover 12 are provided with tabs 132 that engage with the respective first receiving grooves 111. The LED light bar 4 includes a substrate and an LED fixed on the substrate, wherein the substrate is clighted and fixed in the second receiving grooves 112. The light tube 1 is provided with switches and/or an indicator light coupled to the driving circuit. The inner walls of the light transmitting cover 12 are provided with positioning grooves 131, and the circuit board 5 is fixed in the positioning grooves 131. The switches and/or the indicator light are fixed on the circuit board 5. The light transmitting cover 12 is further provided with dodging openings, and the switches and/or the indicator light are exposed outside at the dodging openings.

For example, the switches and/or the indicator light in the foregoing embodiments may specifically include a third switch 53, a fifth switch 51, and an indicator light 52. Three dodging openings are spaced-apart from each other, and the third switch 53, the fifth switch 51, and the indicator 52 correspond to and are exposed outside at the three dodging openings, respectively.

In one embodiment, an installation chamber 113 is formed between the substrate and the bottom case 11. The driving circuit is integrated in a circuit board that is fixed in the installation chamber 113. In one embodiment, the bottom case 11 and the light transmitting cover 12 are semi-cylindrical. In one embodiment, the bottom shell 11 is a profiled member, and the outside of the bottom case 11 may be provided with heat dissipation ribs 114. In one embodiment, two opposite edges of the bottom case 11 in the circumferential direction are bent inward to form respective bent portions. The first receiving grooves 111 are opened outside the respective bent portions, and the second receiving grooves 112 are opened inside the respective bent portions. In one embodiment, the light transmitting cover 12 is configured as a multi-sectional structure that includes multiple sections which are connected one after another in the length direction, wherein one section that is located at an end serves as an installation section 13, and the positioning grooves 131 are opened at the inner wall of the installation section. In one embodiment, there are two positioning grooves 131 that are arranged opposite to each other, and two opposite sides of the circuit board 5 are inserted into the corresponding positioning grooves 131. In one embodiment, the inner wall of the installation section 13 is provided with pairs of protruding bars, and the gap between the same pair of protruding bars serves as one of the positioning grooves 131. In one embodiment, the end cap 2 and the end cap 3 surround and are fixed with the two ends of the tube body 1, respectively.

The working process of the LED emergency light according to the present disclosure will be specifically described with reference to the foregoing embodiments and the drawings. After the LED emergency light is installed, the fifth switch is closed.

In the initial state, the first switch coupled to the first terminal is turned off; in other words, the mains power (120V-277V) cannot be supplied to the first terminal. However, the second switch is a normally closed switch, so the mains power (120V-277V) is supplied to the second terminal.

When the first optocoupler switch is turned off, the operation condition of the constant current module (MT7933) is not met. In other words, the MOS transistor Q4 is turned on and thus the base of the triode Q3 is grounded to turn off the triode Q3, so that the power supplying terminal, i.e., the pin 5, of the first controller U2 is not powered, which results that the first controller U2 does not operate. The external power source cannot supply power to the LED via the mains branch, and the LED cannot be normally lit.

Because the mains power is supplied to the second terminal, both the constant voltage module (MT7990) and the microcontroller of the control module operate. After the microcontroller operates, the MOS transistor Q6 which serves as the fourth switch is first turned on so that the base of the triode Q7 is at a high level and thus the triode Q7 is turned off, and therefore the third controller U5 (MT7282) of the boosting module does not work. The inductor L2 cannot boost the power to power the LED. In other words, the emergency branch cannot supply power to the LED.

Since the MOS transistor Q6 is turned on, the battery pack BAT1 can be charged normally, and the indicator light configured as the light emitting diode LED1 is lit.

When a user wants to turn on the light, he/she can close the first switch. At this time, the first terminal is powered on, the first optocoupler switch is turned on, and the corresponding operation condition of the constant current module is met. In other words, the gate of the MOS transistor Q4 is at a low level and thus the MOS transistor Q4 is turned off, the triode Q3 is turned on to supply power to the power supplying terminal (i.e., the pin 5) of the first controller U2, and the mains branch is turned on to light the LED.

Similarly, the emergency branch cannot supply power to the LED, the battery pack BAT1 can be charged normally, and the indicator light configured as the light emitting diode LED1 is lit.

In the case where the second switch is turned off (in this case, the emergency branch can be detected), power cannot be supplied to the second terminal, the second rectifier and filter unit cannot output power, and the constant voltage module and the constant current module do not operate. It is understandable that the battery pack BAT1 is not charged, and the light emitting diode LED1 is not lit, either.

Because the microcontroller U6 of the control module is powered by the battery pack BAT1 and thus can operates normally. The microcontroller U6 cannot detect the mains signal at the output terminal of the constant voltage module, so the MOS transistor Q6 is turned off; the triode Q7 configured as the second control element is turned on, and the third controller U5 of the boosting module operates; the inductor L2 boosts the power to power the LED. In other words, the emergency branch supplies power to the LED.

In this case, since the second switch is turned off, the mains power is also disconnected. Because the constant current module does not operate, it does not make sense to open or close the first optocoupler. Correspondingly, the first switch does not operate, either.

In the case where the third switch is turned on (in this case, the emergency branch can be detected), the microcontroller U6 obtains an instruction and turns on the second optocoupler, and the triode Q3 is turned off, so that power cannot be supplied to the power supplying terminal (i.e., the pin 5) of the first controller U2, which results that the constant current module cannot operate. The mains branch cannot supply power to the LED, and the LED cannot be normally lit.

At the same time, the microcontroller U6 also causes the MOS transistor Q6 to be turned off, the battery pack BAT1 is not charged, and the light emitting diode LED1 is not lit, either. When the MOS transistor Q6 is turned off, the triode Q7 of the switching module is turned on, and then the third controller U5 of the boosting module operates. The inductor L2 boosts the power to power the LED. In other words, the emergency branch supplies power to the LED.

In this state, because the constant current module does not operate, it does not make sense to open or close the first optocoupler. Correspondingly, the first switch does not operate, either.

The second switch is arranged in the AC line outside the light tube, and the third switch is directly arranged on the light tube, which realizes dual emergency detection functions. The third switch facilitates the detection during installation, and the second switch facilitates the detection after installation.

In the case where the mains power is disconnected, neither the first terminal nor the second terminal is powered. Neither the constant voltage module nor the constant current module can operate, and the mains branch cannot supply power to the LED. The LED cannot be normally lit. At the same time, the MOS transistor Q6 is turned off, the battery pack BAT1 is not charged, and the light emitting diode LED1 is not lit, either. Triode Q7 is turned on, and then the third controller U5 of the boosting module operates. The inductor L2 boosts the power to power the LED. In other words, the emergency branch supplies power to the LED.

In order to prevent the battery pack from over-discharging, the microcontroller U6 is configured to detect the power supplying time of the emergency branch. For example, when the time is greater than 90 minutes (in practice, the time limitation is related to the capacity of the battery pack BAT1 and may be adjusted as required), the voltage of the battery pack BAT1 drops to the warning value, then the charging and discharging management module of the microcontroller U6 or the battery pack BAT1 itself will stop supplying power, and the LED will go out. Alternatively, the microcontroller U6 can communicate with the charging and discharging management module to stop supplying power.

Because the voltage of the battery pack BAT1 is low, the microcontroller will also stop operating and enter a sleep and power-saving mode.

When the mains power is restored, the first and second terminals are powered, and all of the constant voltage module, the constant current module (which depends on the condition of the first switch) and the microcontroller can operate normally.

In one embodiment, the microcontroller periodically charges and discharges the power storage element of the power storage module, which facilitates to maintain the performance of the power storage element.

In one embodiment, the microcontroller sleeps when no mains signal is received. Failure to receive the mains signal may be a result of a power failure or that the second switch is turned off, that is, the constant voltage module does not output power. During transportation or storage, the fifth switch is generally turned off, and the power storage element has not yet entered the operation state. The microcontroller gets into a low-power state after entering the sleep mode. The microcontroller will be woken up until the sleep condition is released, for example, until the second terminal is powered on.

In one embodiment, the microcontroller turns off the constant current module and closes the fourth switch when the fifth switch is opened.

In one embodiment, the microcontroller periodically charges and discharges the power storage element of the power storage module after the LED emergency light has operated for a predetermined time period such as 30 days, and stops timing during sleep. The microcontroller starts timing after being powered on for the first time, and stops timing during sleep, and continues to timing after being woken up. In addition, the timing time is accumulated.

An embodiment of the present disclosure further provides a control method of an LED emergency light, wherein the LED emergency light is the LED emergency light according to the foregoing embodiment, and the control method includes charging and discharging the power storage element of the power storage module by the control module in a periodic manner.

In one embodiment, when discharging, the mains branch is first turned off, and then the emergency branch is driven to supply power to the LED.

In one embodiment, the technique of turning off the mains branch is to send a signal to the constant current module through the second optocoupler to turn off the constant current module. After the control module turns on the second optocoupler, the base of the triode Q3 is grounded and thus turned off, the first controller U2 stops operating, and the mains branch no longer supplies power to the LED.

In one embodiment, the technique of driving the emergency branch to supply power to the LED is to turn off the fourth switch, and the switching module causes the boosting module to supply power to the LED.

The discharging degree can be controlled according to a time period and/or the voltage of the power storage element. For example, in one embodiment, after power is discharged for a predetermined time period, the emergency branch will be turned off to stop supplying power to the LED. In one embodiment, when power is discharged until the voltage of the power storage element is lower than the threshold, the emergency branch will be turned off to stop supplying power to the LED. In one embodiment, the technique of turning off the emergency branch to stop supplying power to the LED is to turn on the fourth switch. In one embodiment, when charging, the emergency branch is first turned off to stop supplying power to the LED, and then the mains branch is turned on. In one embodiment, the technique of turning on the mains branch is to turn off the second optocoupler. After the control module turns off the second optocoupler, the right of turning off is released. Thereafter, depending on the operation condition of the first switch, the triode Q3 is turned on or off. The mains branch can be controlled to or not to supply power to the LED by means of the first switch.

The technique of discharging and charging in sequence can also avoid simultaneous-turning-on.

FIG. 23 shows the control logic diagram of the control module of the LED in the present disclosure.

In the figure, the microcontroller of the control module is taken as the action body. Turning on or off the constant current module means releasing or obtaining the right of turning off the constant current module by sending a signal to the constant current module through the second optocoupler. When the constant current module is turned on, the pin 3 of the microcontroller is set to a low level, and when the constant current module is turned off, the pin 3 of the microcontroller is set to a high level.

Turning on or off the fourth switch means charging or non-charging the battery pack, and also means that the battery pack does not supply or does supply power to the LED through the emergency branch. When the fourth switch is turned on, the pin 2 of the microcontroller is set to a high level, and when the fourth switch is turned off, the pin 2 of the microcontroller is set to a low level.

The detection of the mains signal is determined by whether the pin 6 of the microcontroller is at a high level, whether the third switch is turned on or off is determined by the pin 4, whether the fifth switch is turned on or off is determined by the voltage comparison of the pin 5 and the pin 7, and whether the voltage of the battery pack is higher than the threshold is determined by the voltage of pin 7. During the discharging of the battery pack, that is, during supplying power to the LED through the emergency branch, the microcontroller is in a detection state for low power and detects the voltage of the battery pack in real time to avoid an over-discharge and thus protect the battery.

With reference to the above related embodiments, one embodiment of the present disclosure provides a control method for the LED emergency light, including: S100, detecting a mains signal after starting up; S200, detecting whether the fifth switch is closed if the mains signal is detected; S300, detecting whether the third switch is closed if the fifth switch is detected to be closed; S400, sending a turning-on signal to the fourth switch if the third switch is not closed (which means that the LED can operate normally); S500, sending a signal of releasing the right of turning off to the constant current module after a delay such as by 50 ms. The LED emergency light can now be turned on or off by means of the first switch.

Sending a signal of releasing the right of turning off to the constant current module means turning off the second optocoupler.

In one embodiment, in step S200 of detecting whether the fifth switch is closed, if the fifth switch is closed, the constant current module is then turned off, and after a delay, the fourth switch is opened. In one embodiment, in step S300 of detecting whether the third switch is closed, if the third switch is closed (which means that a test for the emergency branch is required), the constant current module is then turned off, and after a delay, the fourth switch is opened. In one embodiment, when the closing time of the third switch exceeds a threshold such as five seconds, the microcontroller enters a detection state for low power.

In this embodiment, a function of detecting an active discharging is provided. When the microcontroller detects that the closing time of the third switch exceeds a threshold such as five seconds, the power storage element discharges. When discharging, the constant current module is first turned off, and the fourth is turned off after a delay. In other words, the power storage element is discharged by supplying power to the LED through the emergency branch, and the operation time is reset.

In one embodiment, the control method for the LED emergency light further includes recording the normal operation time of the LED emergency light, and discharging the power storage element of the power storage module when the operation time reaches a threshold such as 30 days. When discharging, the constant current module is first turned off, and the fourth switch is then turned off after a delay; in other words, the power storage element is discharged by supplying power to the LED through the emergency branch. During discharging, the voltage of the power storage element is detected in real time. When the voltage of the power storage element drops below an expected value, the fourth switch is turned on (that is, charging the battery pack and no longer supplying power to the LED by the emergency branch); after a delay, sending a signal of releasing the right of turning off to the constant current module (that is, turning off the second optocoupler).

The LED emergency light according to the present disclosure can be normally turned on or off, with the function of conventional lighting tube, and can also be used as an emergency light in the case where the mains power is disconnected. In other words, the LED emergency light can be used in both commercial situation and emergency situation. When the LED emergency light is removed from the light holder, it can also be used as a mobile emergency light.

What is claimed is:

1. An LED emergency light, comprising an LED and a driving circuit, wherein the driving circuit comprises a mains branch and an emergency branch with a power storage module; when power is on, an external power source supplies power to the LED via the mains branch, when power is off, the power storage module supplies power to the LED; the driving circuit further comprises a control module which has a first signal input terminal for detecting a mains power signal and a second signal input terminal coupled to the mains branch for controlling on/off of the mains branch; when power is off, the control module turns off the mains branch, when power is on, the control module releases the control of turning off the mains branch after the emergency branch stops supplying power to the LED.

2. The LED emergency light according to claim 1, wherein the emergency branch has a charging circuit, and when power is on, the external power source charges the power storage module via the charging circuit to store power, and the power storage module stops charging the LED.

3. The LED emergency light according to claim 2, wherein the emergency branch comprises a second rectifier and filter module, a constant voltage module, and a power storage module that are coupled in sequence, and the mains branch comprises a second rectifier and filter module and a constant current module, wherein the mains branch and the emergency branch share the second rectifier and filter module.

4. The LED emergency light according to claim 2, wherein the control module has a power supplying terminal that is coupled to both the power storage module and the charging circuit.

5. The LED emergency light according to claim 2, wherein the first signal input terminal of the control module is coupled to the charging circuit.

6. The LED emergency light according to claim 5, wherein the emergency branch comprises a second rectifier and filter module, a constant voltage module, and a power storage module that are coupled in sequence, wherein when power is on, the external power source charges the power storage module via the second rectifier and filter module and the constant voltage module to store power, and the first signal input terminal of the control module is coupled to an output terminal of the constant voltage module.

7. The LED emergency light according to claim 2, wherein the control module has a first signal output terminal coupled to the charging circuit for controlling on/off of the charging circuit, and the charging circuit has a fourth switch for controlling the on/off of the charging circuit, wherein the fourth switch is coupled to the first signal output terminal and is controlled by the control module.

8. The LED emergency light according to claim 7, wherein when power is off, the control module turns off the fourth switch and the mains branch, and when power is on, the fourth switch is first turned on, and the mains branch is then turned on.

9. The LED emergency light according to claim 7, wherein the control module periodically turns off the mains branch and the charging circuit in sequence, and then the power storage module supplies power to the LED.

10. The LED emergency light according to claim 7, wherein the driving circuit further comprises a third switch coupled to the control module, the third switch instructs the control module to turn off the mains branch and the charging circuit in sequence, and then the power storage module supplies power to the LED.

11. The LED emergency light according to claim 7, wherein the emergency branch comprises a second rectifier and filter module, a constant voltage module, and a power storage module that are coupled in sequence, and the fourth switch is coupled to between the constant voltage module and the power storage module.

12. The LED emergency light according to claim 2, wherein the power storage module has a signal input terminal coupled to the charging circuit for detecting a charging signal, and when the external power source charges the power storage module, the power storage module stops supplying power to the LED, otherwise, the power storage module supplies power to the LED.

13. The LED emergency light according to claim 12, wherein the power storage module comprises:
a power storage element, which is coupled to an output terminal of the charging circuit;
a boosting module, which is coupled to the power storage element and used to boost the output voltage of the power storage element to supply power to the LED;
a switching module, which is used to detect the output voltage of the charging circuit to control an operation of the boosting module.

14. The LED emergency light according to claim 13, wherein the power storage module further comprises a protection module coupled between the output terminal of the charging circuit and the power storage element for protecting the power storage element.

15. The LED emergency light according to claim 13, wherein the power storage module further comprises an indicating module coupled to the output terminal of the charging circuit for displaying information during charging.

16. The LED emergency light according to claim 15, wherein the protection module comprises an anti-reverse diode coupled between the power storage element and the indicating module in series.

17. The LED emergency light according to claim 13, wherein the LED emergency light comprises a fifth switch coupled between the power storage element and the boosting module for controlling the discharging of the power storage element.

18. The LED emergency light according to claim 12, wherein the charging circuit comprises a second rectifier and filter module and a constant voltage module, and a fourth switch is coupled between the constant voltage module and the power storage module, wherein the signal input terminal of the power storage module is coupled to an output terminal of the fourth switch.

19. The LED emergency light according to claim 1, wherein the control module is isolated from the mains branch by a second optocoupler.

20. The LED emergency light according to claim 1, wherein the mains branch is provided with a first control element controlled by the control module for controlling the on/off of the mains branch.

21. The LED emergency light according to claim 1, wherein the driving circuit further comprises a signal branch, and the LED emergency light has two power connecting terminals that is a first terminal and a second terminal, respectively, wherein the driving circuit comprises a mains branch and a signal branch, and wherein the signal branch is coupled to the first terminal for transmitting external driving signals to control on/off of the mains branch, and the main branch is coupled to the second terminal for transmitting power to the LED for power supply; the control module controls the on/off of the mains branch before the signal branch controls the mains branch.

22. The LED emergency light according to claim 21, wherein the signal branch and the mains branch are isolated by a first optocoupler.

23. The LED emergency light according to claim 22, wherein the signal branch comprises a first rectifier and filter module and a first optocoupler, and the mains branch comprises a second rectifier and filter module and a constant current module that are coupled in sequence, wherein a secondary side of the first optocoupler is coupled to the constant current module.

24. The LED emergency light according to claim 20, wherein the mains branch is provided with a first control element for controlling the on/off of the mains branch, and the first control element is controlled by the external driving signals.

25. The LED emergency light according to claim 24, wherein the mains branch comprises a second rectifier and filter module and a constant current module coupled in sequence.

26. The LED emergency light according to claim 25, wherein the constant current module comprises a continuous current unit and a switching element coupled between the second rectifier and filter module and the LED, and a first controller for controlling the switching element, wherein the first control element is coupled between the second rectifier and filter module and a power supplying terminal of the first controller.

27. The LED emergency light according to claim 26, wherein the first control element is configured as a triode, a collector of the triode is coupled to the second rectifier and filter module, an emitter is coupled to the power supplying terminal of the first controller, and a base receives the external driving signals or control signals of a control module.

28. The LED emergency light according to claim 27, wherein the signal branch comprises a first rectifier and filter module and a first optocoupler coupled in sequence, and a second signal output terminal of the control module is coupled to a second optocoupler; the base of the triode is grounded through a MOS transistor Q4 and a MOS transistor Q8, respectively, wherein the first optocoupler is coupled to a gate of the MOS transistor Q4, and the second optocoupler is coupled to a gate of the MOS transistor Q8.

29. The LED emergency light according to claim 2, wherein the LED light comprises a light tube in which an LED light bar and a driving circuit are installed, and the light tube comprises a tube body and end caps fixed at both ends of the tube body, wherein each of the end caps is respectively fixed with two pins.

30. The LED emergency light according to claim 29, wherein the tube body comprises a bottom case and a light transmitting cover that are engaged with each other in a radial direction, and the light transmitting cover is provided with a dodging opening for exposing a switch and/or an indicator light.

31. The LED emergency light according to claim 30, wherein the power storage module has a fifth switch for controlling the charging and discharging of the power storage module, and the fifth switch is exposed at the dodging opening.

32. The LED emergency light according to claim 30, wherein the output terminal of the charging circuit is coupled to an indicating module having an indicator light, and the indicator light is exposed to the dodging opening.

33. The LED emergency light according to claim 30, wherein the driving circuit further comprises a third switch coupled to the control module, the third switch instructs the control module to turn off the mains branch and the charging circuit in sequence, and then the power storage module supplies power to the LED, wherein the third switch is exposed at the dodging opening.

34. The LED emergency light according to claim 33, wherein the fifth switch, the third switch or the indicator light are fixed on a circuit board, and an inner wall of the light transmitting cover is provided with positioning grooves, and the circuit board is fixed in the positioning grooves.

35. The LED emergency light according to claim 30, wherein outer walls of the bottom case at two opposite sides in the radial direction are provided with first receiving grooves, and inner walls of the bottom case at two opposite sides in the radial direction are provided with second receiving grooves, wherein the light transmitting cover is provided with tabs that engage with the first receiving grooves, the LED light bar comprises a substrate and the LED fixed on the substrate, and wherein the substrate is clighted and fixed at the second receiving grooves.

36. The LED emergency light according to claim 35, wherein an installation chamber is formed between the substrate and the bottom case, and the driving circuit is fixed in the installation chamber by means of a circuit board.

37. The LED emergency light according to claim 30, wherein the light transmitting cover has a multi-sectional structure that includes multiple sections which are connected one after another in a length direction, wherein one section that is located at an end serves as an installation section, and the dodging opening is provided at the installation section.

38. A control method of an LED emergency light, the LED emergency light comprising an LED and a driving circuit comprising an emergency branch, a mains branch and a control module, wherein the emergency branch comprising a charging circuit and a power storage module; when power is off, the power storage module supplies power to the LED, when power is on, an external power source supplies power to the LED via the mains branch and charges the power storage module via the charging circuit to store power, and the power storage module stops supplying power; wherein, the control method comprises the following steps:
   turning off the mains branch by the control module when power is off; and
   releasing the control of turning off the mains branch by the control module after the power storage module stops supplying power to the LED when power is on.

39. The control method according to claim 38, wherein the charging circuit has a fourth switch for controlling on/off of the charging circuit; wherein the control method comprises:

turning off the fourth switch by the control module when power is off, and first turning on the fourth switch, and then releasing the control of turning off the mains branch by the control module when power is on.

40. The control method according to claim 39, wherein the emergency branch comprises a second rectifier and filter module, a constant voltage module, and a fourth switch controlled by the control module, which are coupled in sequence.

41. The control method according to claim 40, wherein the control module has a first signal input terminal coupled to an output terminal of the constant voltage module.

42. The control method according to claim 39, wherein the power storage module has a signal input terminal coupled to an output terminal of the fourth switch for detecting a charging signal.

43. The control method according to claim 38, wherein the power storage module comprises a power storage element, and wherein the control method comprises:

entering a sleep state when the control module detects that the output voltage of the power storage element is lower than a set value.

44. The control method according to claim 43, wherein the control method comprises:

releasing the sleep state when the control module detects a mains power signal.

45. The control method according to claim 39, wherein the driving circuit comprises a third switch coupled to the control module, and wherein the control method comprises:

turning off the mains branch and the charging circuit in sequence by the control module if the third switch is closed, and first turning on the charging circuit, and then releasing the control of turning off the mains branch by the control module if the third switch is opened.

46. The control method according to claim 39, wherein the power storage module has a fifth switch for controlling the charging and discharging of the power storage module, and wherein the control method comprises:

turning off the mains branch and the charging circuit in sequence by the control module if the fifth switch is turned off, and first turning on the charging circuit, and then releasing the control of turning off the mains branch by the control module if the fifth switch is closed.

47. The control method according to claim 39, wherein the control method comprises:

periodically turning off the mains branch and the charging circuit in sequence by the control module, so that the power storage module supplies power to the LED.

* * * * *